US010404913B2

(12) United States Patent
Kawaguchi et al.

(10) Patent No.: US 10,404,913 B2
(45) Date of Patent: Sep. 3, 2019

(54) PORTABLE TERMINAL DEVICE AND METHOD FOR CONTROLLING POWER OF PORTABLE TERMINAL DEVICE

(71) Applicant: Olympus Corporation, Hachioji-shi, Tokyo (JP)

(72) Inventors: Katsuhisa Kawaguchi, Atsugi (JP); Koichi Shintani, Hachioji (JP); Haruyuki Ishihara, Hino (JP); Osamu Nonaka, Sagamihara (JP)

(73) Assignee: Olympus Corporation, Tokyo (JP)

( * ) Notice: Subject to any disclaimer, the term of this patent is extended or adjusted under 35 U.S.C. 154(b) by 31 days.

(21) Appl. No.: 15/485,618

(22) Filed: Apr. 12, 2017

(65) Prior Publication Data

US 2017/0223270 A1    Aug. 3, 2017

Related U.S. Application Data

(63) Continuation of application No. 14/958,615, filed on Dec. 3, 2015, now Pat. No. 9,661,220, which is a continuation of application No. 14/106,320, filed on Dec. 13, 2013, now Pat. No. 9,232,136, which is a continuation of application No. 12/749,259, filed on Mar. 29, 2010, now Pat. No. 8,610,821.

(30) Foreign Application Priority Data

Apr. 2, 2009  (JP) ................... 2009-090383

(51) Int. Cl.
*H04N 5/77* (2006.01)
*H04N 5/92* (2006.01)
*G06F 3/041* (2006.01)
*H04N 5/232* (2006.01)

(52) U.S. Cl.
CPC ........ *H04N 5/23241* (2013.01); *G06F 3/041* (2013.01); *H04N 5/232* (2013.01); *H04N 5/23245* (2013.01); *H04N 5/23293* (2013.01); *H04N 5/772* (2013.01); *H04N 5/9201* (2013.01)

(58) Field of Classification Search
CPC .......... H04N 1/00408; H04N 1/00411; H04N 1/00413; H04N 5/232; H04N 5/23241; H04N 1/00891; H04N 1/00896; H04N 1/00904; H04N 5/23293; G03B 2217/007
See application file for complete search history.

(56) References Cited

U.S. PATENT DOCUMENTS 6,009,336 A * 12/1999 Harris ................. H04M 1/0227
                                                          348/E7.079
6,154,210 A * 11/2000 Anderson .............. G03B 17/02
                                                          715/840

(Continued)

*Primary Examiner* — Nicholas G Giles
(74) *Attorney, Agent, or Firm* — John C. Pokotylo; Pokotylo Patent Services

(57) ABSTRACT

A portable terminal device comprising: a control section that controls power supplied to a display section; and an acceleration detection section including a comparator that outputs a signal when the power is supplied to the display section even in a power-off state and acceleration equal to or greater than a predetermined value is detected, wherein the control section starts supplying the power to the display section, if there is no vibration during a predetermined time, after detecting the acceleration equal to or greater than the predetermined value with the acceleration detection section.

26 Claims, 18 Drawing Sheets

(56) References Cited

U.S. PATENT DOCUMENTS

| | | | | |
|---|---|---|---|---|
| 6,738,075 | B1* | 5/2004 | Torres | G11B 27/034 |
| | | | | 348/333.05 |
| 7,508,444 | B1* | 3/2009 | Napoli | H04N 5/232 |
| | | | | 348/333.01 |
| 7,894,860 | B2* | 2/2011 | Moon | H04N 1/00129 |
| | | | | 348/14.07 |
| 8,013,894 | B2* | 9/2011 | Niwa | H04N 5/232 |
| | | | | 348/208.16 |
| 2002/0012050 | A1* | 1/2002 | Oka | H04N 5/2252 |
| | | | | 348/211.99 |
| 2004/0201772 | A1* | 10/2004 | Kobayashi | H04N 5/232 |
| | | | | 348/372 |
| 2005/0200703 | A1* | 9/2005 | Kobayashi | H04N 1/00323 |
| | | | | 348/207.2 |
| 2006/0204232 | A1* | 9/2006 | Weinberg | G03B 7/00 |
| | | | | 396/50 |
| 2006/0285843 | A1* | 12/2006 | Sakurai | H04N 5/232 |
| | | | | 396/303 |
| 2008/0062297 | A1* | 3/2008 | Sako | G02B 27/017 |
| | | | | 348/333.02 |
| 2008/0074499 | A1* | 3/2008 | Niimura | H04N 1/00249 |
| | | | | 348/207.1 |
| 2009/0154833 | A1* | 6/2009 | Sakaue | B41J 2/175 |
| | | | | 382/282 |
| 2010/0110268 | A1* | 5/2010 | Akita | G03B 13/04 |
| | | | | 348/333.05 |
| 2010/0141592 | A1* | 6/2010 | Andrievsky | G06F 3/04883 |
| | | | | 345/173 |
| 2010/0177216 | A1* | 7/2010 | Odaka | H04N 5/2353 |
| | | | | 348/240.2 |

* cited by examiner

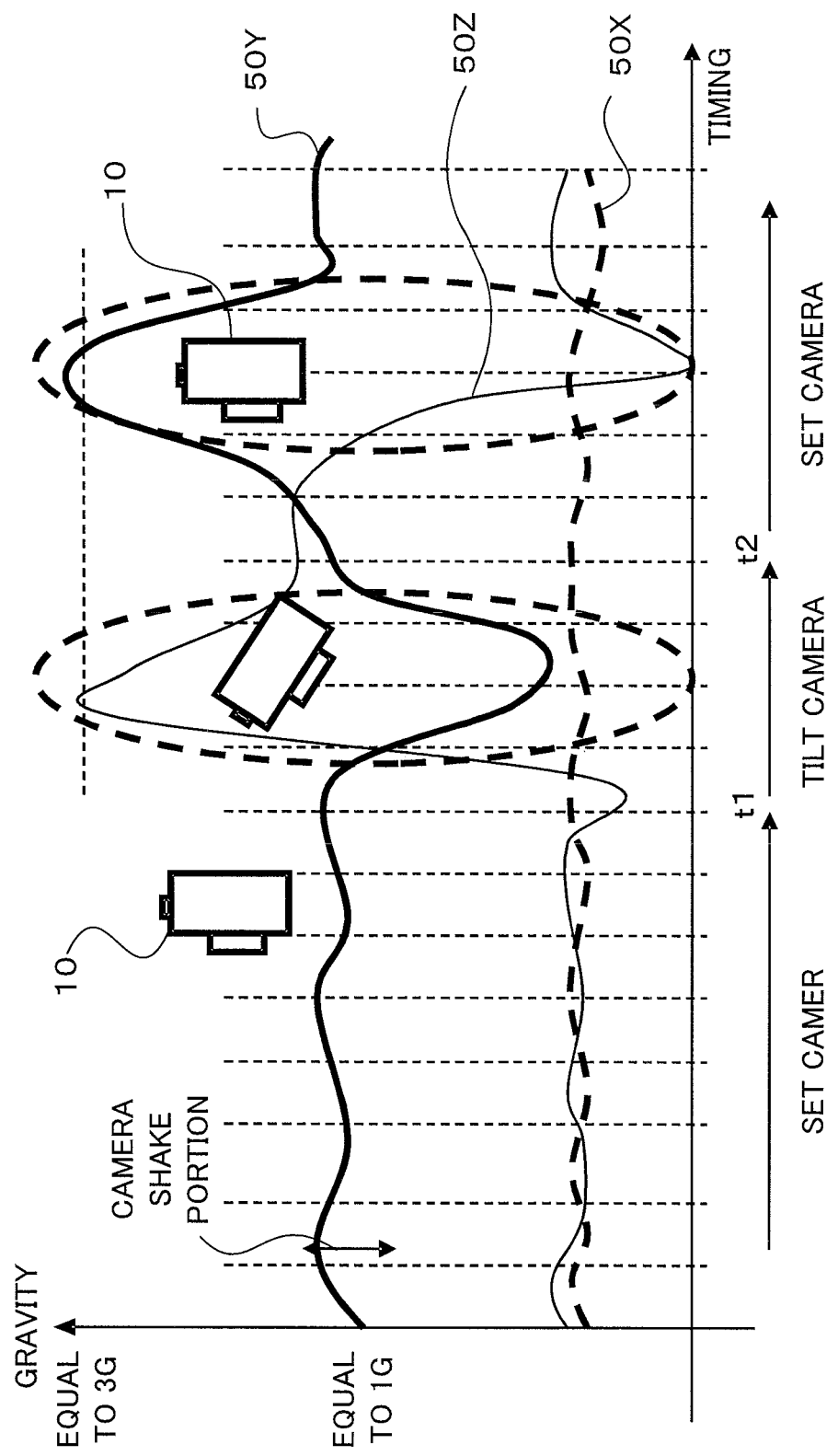

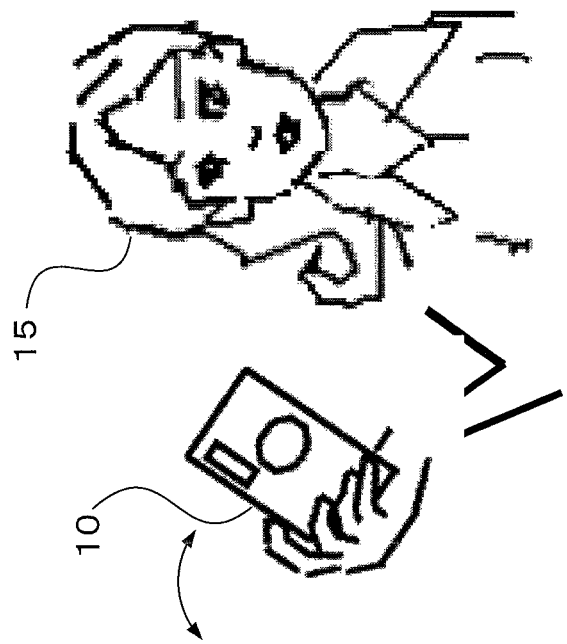
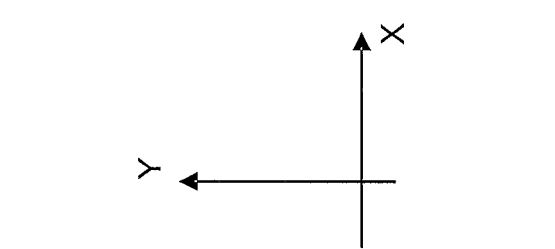
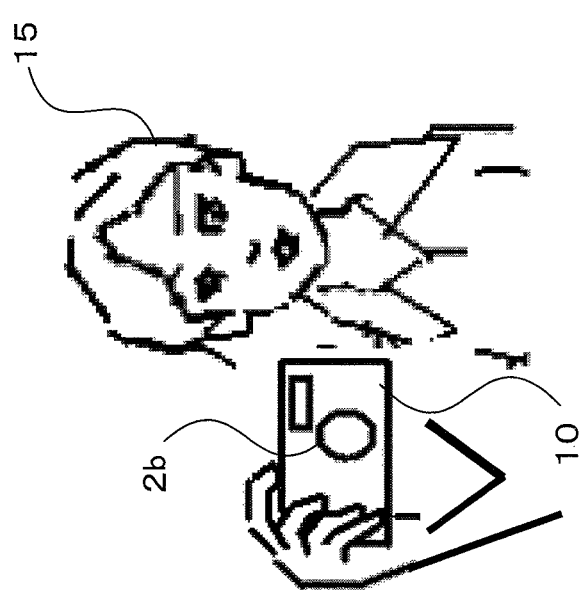

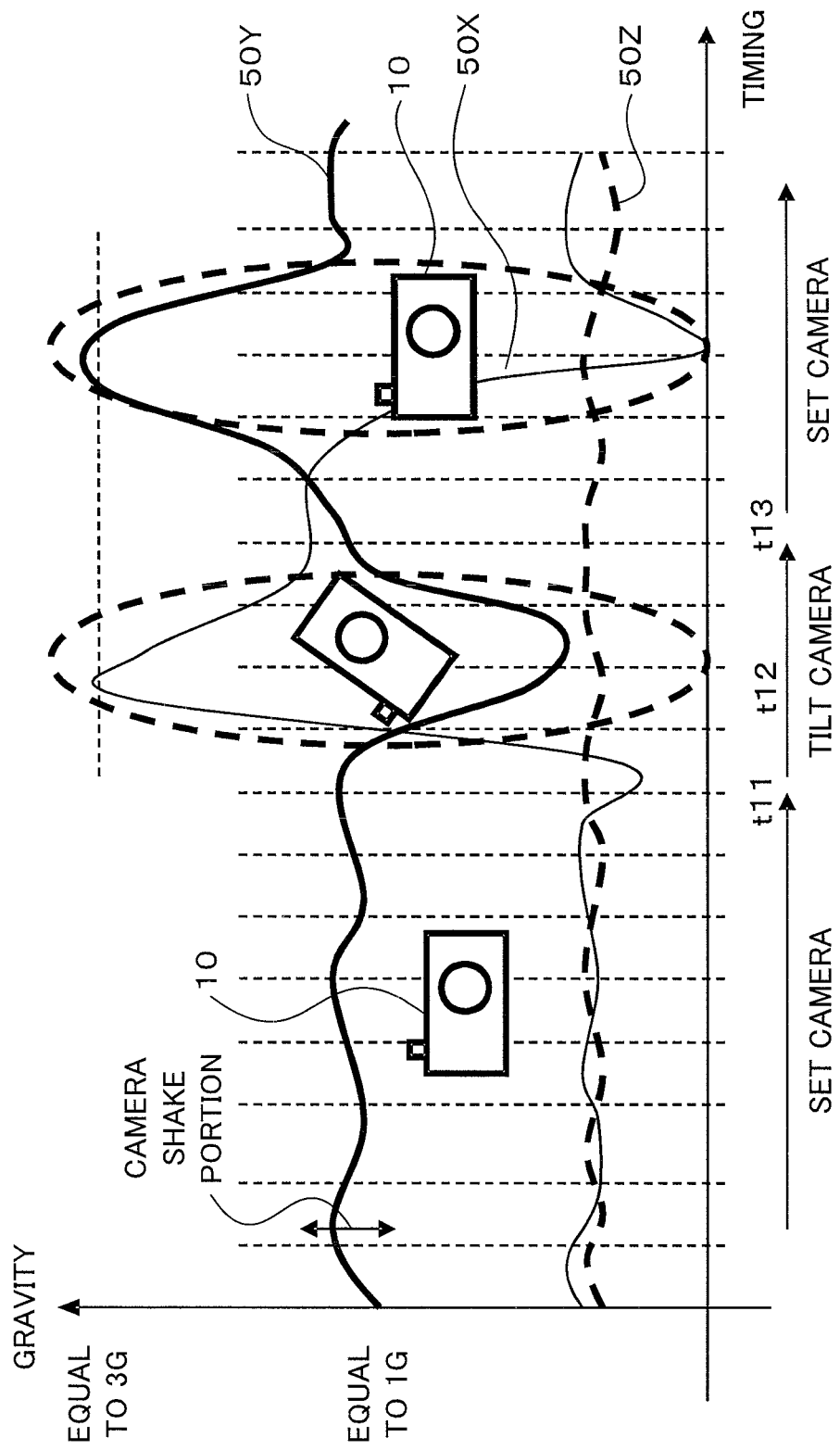

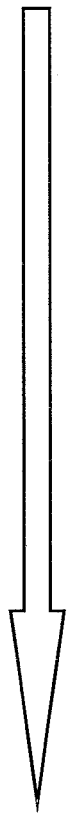

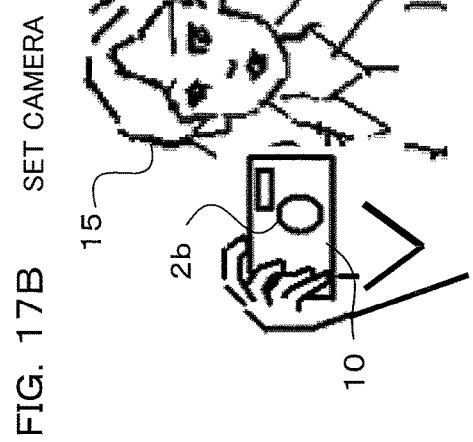
FIG. 17B  SET CAMERA
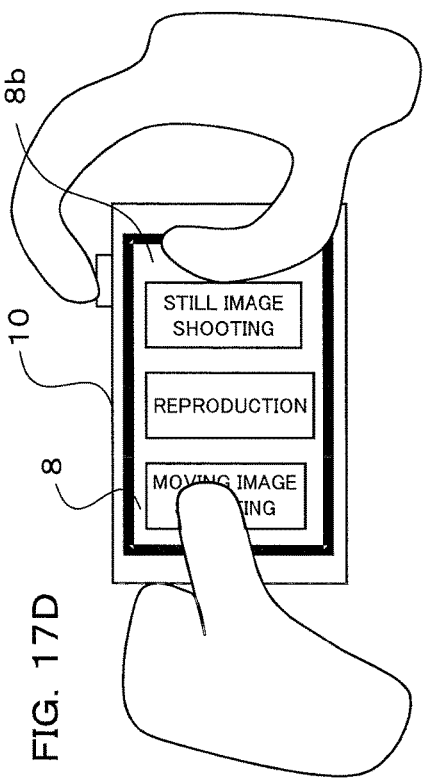
FIG. 17D
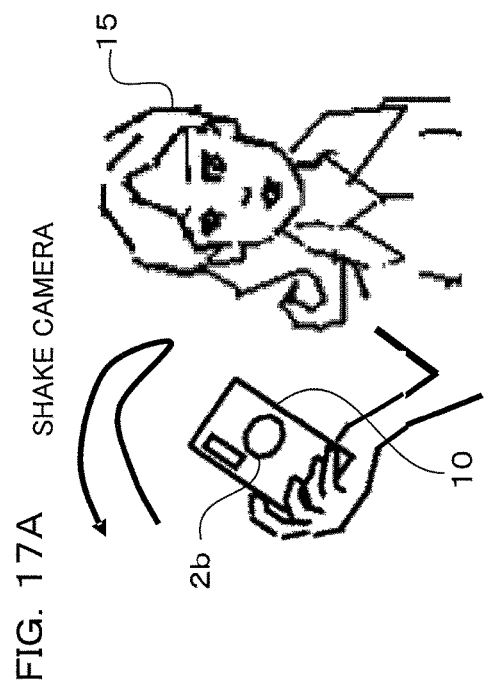
FIG. 17A  SHAKE CAMERA
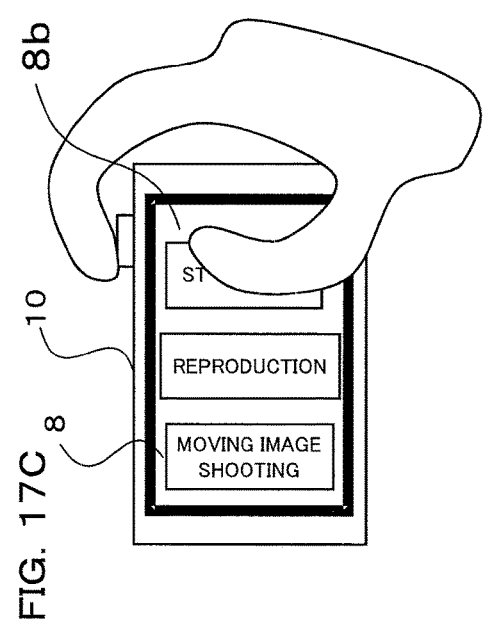
FIG. 17C ns, the '615
PORTABLE TERMINAL DEVICE AND METHOD FOR CONTROLLING POWER OF PORTABLE TERMINAL DEVICE

RELATED APPLICATIONS

This application is a continuation application of U.S. patent application Ser. No. 14/958,615 (referred to as "the '615 application" and incorporated herein by reference), filed on Dec. 3, 2015, titled "PORTABLE TERMINAL DEVICE AND METHOD FOR CONTROLLING POWER OF PORTABLE TERMINAL DEVICE" and listing Katsuhisa KAWAGUCHI, Koichi SHINTANI, Haruyuki ISHIHARA, and Osamu NONAKA as the inventors, the '615 application being a continuation application of U.S. patent application Ser. No. 14/106,320 (referred to as "the '320 application" and incorporated herein by reference), filed on Dec. 13, 2013, titled "IMAGING DEVICE AND METHOD FOR CONTROLLING POWER OF IMAGING DEVICE," listing Katsuhisa KAWAGUCHI, Koichi SHINTANI, Haruyuki ISHIHARA, and Osamu NONAKA as the inventors, and issuing on Jan. 5, 2016 as U.S. Pat. No. 9,232,136, the '320 application claiming benefit of U.S. patent application Ser. No. 12/749,259 (referred to as "the '259 application" filed on Mar. 29, 2010, titled "IMAGING DEVICE AND METHOD FOR CONTROLLING POWER OF IMAGING DEVICE," listing Katsuhisa KAWAGUCHI, Koichi SHINTANI, Haruyuki ISHIHARA, and Osamu NONAKA as the inventors, and issuing on Dec. 17, 2013 as U.S. Pat. No. 8,610,821, incorporated herein by reference), the '259 application claiming benefit of Japanese Application No. 2009-090383 filed in Japan on Apr. 2, 2009, the contents of which are incorporated by this reference.

BACKGROUND OF THE INVENTION

1. Field of the Invention

The present invention relates to an improvement of imaging devices, such as the so-called digital camera, video camera, and mobile telephone with a camera, having a function to take a still image or a moving image, and to an improvement of methods for controlling the power of the imaging devices. More specifically, the present invention relates to an imaging device capable of immediately capturing and imaging an object at the time of setting the camera in use, and a method for controlling the power of the imaging device.

2. Description of the Related Art

In imaging devices, such as a camera, unless the power is frequently turned off when not in use, the power is exhausted, the number of shooting frames decreases, and as a result a photographer may miss a shutter chance. For this reason, power is turned off when not in use, and however unless a power switch is turned on at the time of shooting, the imaging device will not start to operate and a photographer may miss a shutter chance.

There is a method of causing an imaging device to enter a sleep mode instead of turning off a power switch. Japanese Unexamined Patent Publication No. 2007-279553 published on Oct. 25, 2007 discloses an imaging device that detects a camera shake in the power-on state and automatically switches to a sleep mode when there is no camera shake.

SUMMARY OF THE INVENTION

It is an object of the present invention to provide an imaging device that is powered on only by an operation of setting the imaging device and can start imaging without failing to capture an object, and a method for controlling the power of the imaging device.

An imaging device according to the present invention comprises: an imaging section photoelectrically converting an object image and outputting image data; a display section displaying the object image based on the image data; an acceleration sensor section detecting vibration in at least one direction among a plurality of directions of a camera; a determination section continuously determining an output equal to or greater than a gravity force by means of the acceleration sensor section; and a power supply control section supplying power to the imaging section upon detection of an output equal to or greater than the gravity force by the determination section and also upon detection of an attitude change in a vertical direction or the like or a predetermined acceleration when a photographer sets the camera while viewing the display section of the camera.

Moreover, an imaging device according to the present invention comprises: an imaging section photoelectrically converting an object image and outputting image data; a display section displaying the object image based on the image data; a motion detection section detecting motion in at least one direction among a plurality of directions of a camera; an imaging start section starting recording of the image data upon detection of the motion; and a recording section recording the image data together with tilt correction information acquired from the motion detection section when the imaging start section starts imaging.

Moreover, an imaging device according to the present invention comprises: an imaging section photoelectrically converting an object image and outputting image data; a display section displaying the object image based on the image data; a motion detection section detecting motion in at least one direction among a plurality of directions of a camera; an imaging start section starting recording of the image data according to a result of the motion detection; and a display control section creating a trimming image according to attitude information of the camera obtained by the motion detection section when the imaging start section starts imaging and a face image obtained from a continuous image, the recording of which was started by the imaging start section, and displaying this trimming image on the display section.

Moreover, an imaging device according to the present invention comprises: a motion detection section detecting motion in at least one direction among a plurality of directions of a camera; a first determination section continuously determining an output equal to or greater than a gravity force by means of the motion detection section; a second determination section determining by means of the movement detection section whether or not the camera has performed specific motion if the first determination section determined that there was the motion equal to or greater than the gravity force; and a power supply control section turning on power of the camera, when the first determination section detects an output equal to or greater than the gravity force and the second determination section determines that the camera performed the specific motion.

Moreover, an imaging device according to the present invention comprises: a sensor detecting motion applied to a camera; a comparator comparing a detection signal of the sensor with a threshold value; an A/D conversion section A/D-converting the detection signal of the sensor; a determination section A/D-converting the detection signal by means of the A/D conversion section in response to an output from the comparator and thereby determining the motion of the camera; and a power supply control section turning on power of the camera when the determination section detects that the camera has performed specific motion.

Moreover, a method for controlling power of an imaging device according to the present invention comprises the steps of: detecting vibration in at least one direction among a plurality of directions of a camera; continuously determining whether or not there is an output equal to or greater than a gravity force by the detection of the vibration; determining whether or not the camera has performed specific motion when determining that there was the motion equal to or greater than the gravity force; and turning on power of the camera when detecting the output equal to or greater than the gravity force and also detecting that the camera has performed the specific motion as a result of the determinations.

BRIEF DESCRIPTION OF THE DRAWINGS

FIGS. 2A, 2B are views showing a configuration of a tilt detection section in the camera according to the first embodiment of the present invention, wherein FIG. 2A shows the tilt detection section when the camera is in a horizontal position and FIG. 2B shows the tilt detection section when the camera is in a vertical position.

FIG. 3A to FIG. 3D are views illustrating an acceleration detection section in the camera according to the first embodiment of the present invention, wherein FIG. 3A is a perspective view showing a structure of a acceleration detecting sensor, FIGS. 3B, 3C show a detection output of the acceleration sensor, and FIG. 3D is a view showing an arrangement of the acceleration detection section.

FIGS. 4A, 4B are views illustrating a photoelectric sensor touch panel of the camera according to the first embodiment of the present invention, wherein FIG. 4A is a cross sectional view of the touch panel, and FIG. 4B is a cross sectional view of the touch panel when touched by a finger.

FIGS. 5A, 5B are views illustrating a method of turning on power at the time of shooting in the camera according to the first embodiment of the present invention, wherein FIG. 5A shows a state where a photographer sets the camera, and FIG. 5B shows a state where the photographer tilts the camera forward and turns on its power.

FIG. 6 is a signal waveform diagram showing detection signals of the acceleration detection section in the camera according to the first embodiment of the present invention.

FIGS. 8A, 8B are views illustrating a subroutine called "Has the camera set?" of the camera according to the first embodiment of the present invention, wherein FIG. 8A is its flowchart, and FIG. 8B is a view showing a state where a photographer sets the camera.

FIGS. 9A, 9B are views illustrating a method of turning on power at the time of shooting in a camera according to a second embodiment of the present invention, wherein FIG. 9A shows a state where a photographer sets the camera, and FIG. 9B shows a state where the photographer tilts the camera and turns on its power.

FIG. 10 is a signal waveform diagram showing detection signals of an acceleration detection section in the camera according to the second embodiment of the present invention.

FIGS. 17A to 17D are views illustrating a method of turning on power at the time of shooting in a camera according to a fourth embodiment of the present invention, wherein FIG. 17A shows a state where a photographer sets the camera, FIG. 17B a state where the photographer shakes the camera to turn on its power, and FIGS. 17C, 17D show choices at the time of power on.

DESCRIPTION OF THE PREFERRED EMBODIMENTS

Figure 1:
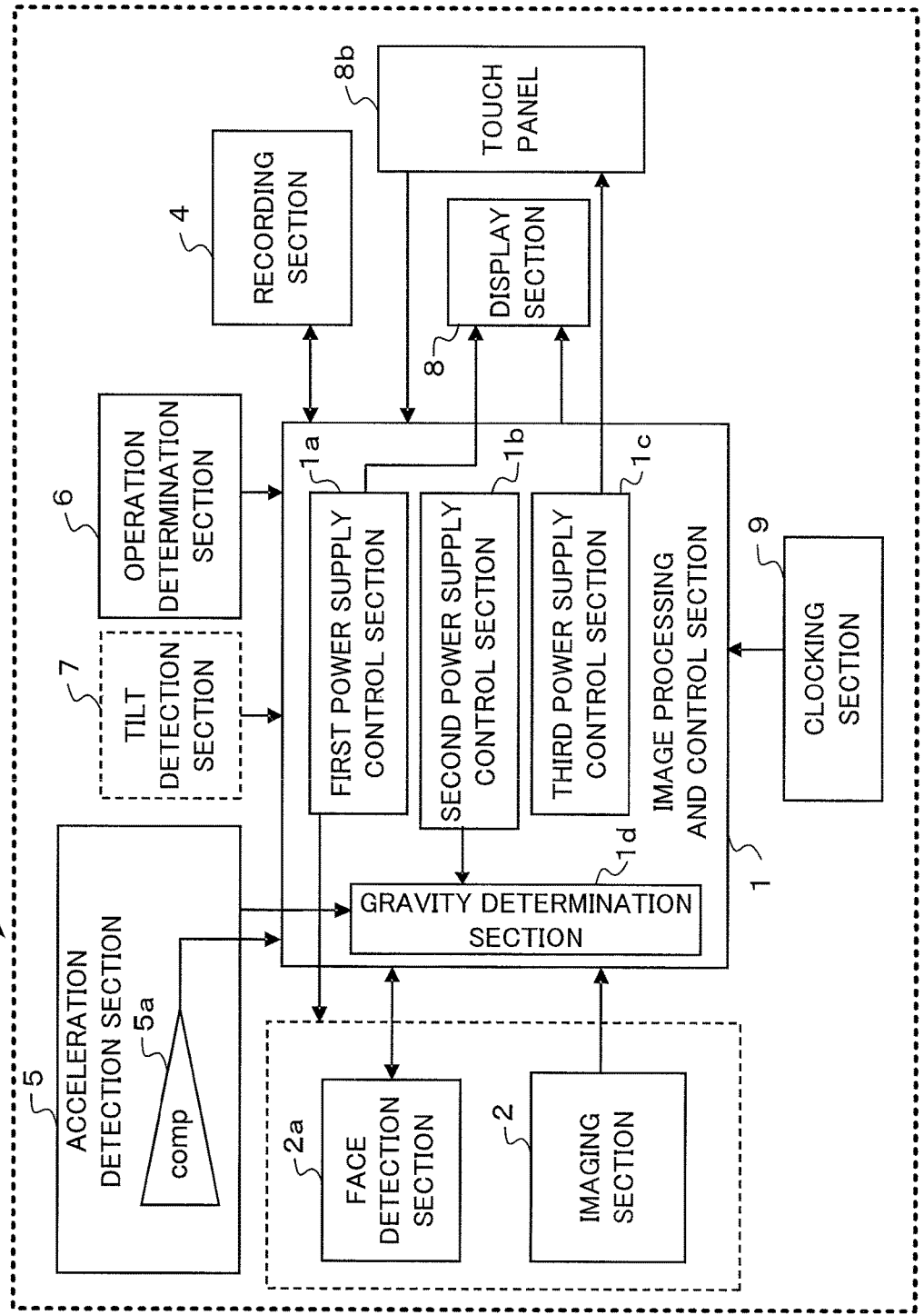
FIG. 1 is a block diagram showing a configuration of a camera according to a first embodiment of the present invention.

Hereinafter, preferred embodiments will be described using a digital camera of the present invention, with reference to the accompanying drawings. FIG. 1 is a block diagram showing a configuration of a camera 10 according to a first embodiment of the present invention. The camera 10 comprises an image processing and control section 1, an imaging section 2, a face detection section 2a, a recording section 4, an acceleration detection section 5, a tilt detection section 7, an operation determination section 6, a display section 8, a touch panel 8b, and a clocking section 9.

The imaging section 2 includes an image sensor photoelectrically converting an object image formed by a photographic lens 2b (see FIG. 5), and outputs the resultant image data to the image processing and control section 1 and the like. The face detection section 2a receives the image data, which is output from the imaging section 2 and image-processed by the image processing and control section 1, determines whether or not a face is contained in the image, and detects its position and the like if the face is contained. The image processing and control section 1 performs image processing of the image data output from the imaging section 2. Moreover, the image processing and control section 1 controls the entire camera 10 according to a program that is stored in a storage section (not shown) in advance. Note that, as the image processing, still-image image processing and moving-image image processing are possible.

The image processing and control section 1 has a first power supply control section 1a, a second power supply control section 1b, a third power supply control section 1c, and a gravity determination section 1d provided therein. The first power supply control section 1a controls the power supply to the display section 8 with a backlight and the like having the highest power consumption and to an imaging system including the imaging section 2 having the second highest power consumption and the face detection section 2a and the like. When power is supplied by the first power supply control section 1a, the camera 10 can perform a normal operation.

The second power supply control section 1b performs A/D conversion of an acceleration detection signal from the acceleration detection section 5, and controls the power supply to the gravity determination section 1d and the like to be described later. The third power supply control section 1c controls the power supply to the touch panel 8b. Note that, a comparator 5a in the acceleration detection section 5 is supplied with a micro power (10 µW level) even in the power-off state. Upon detection of vibration equal to or greater than a predetermined value either in three axis directions or in one axis direction, a signal is output from the comparator 5a. Accordingly, the comparator 5a operates as a determination section that continuously determines an output equal to or greater than the gravity force by means of the acceleration sensor. Moreover, once power supply is started from the second power supply control section 1b to the gravity determination section 1d, further power is continuously supplied to the acceleration detection section 5 and the gravity determination section 1d to enable detection of a minute vibration.

The gravity determination section 1d is a determination section that determines a change in the gravity force due to how to set or move the camera 10, and a more detailed acceleration. The gravity determination section 1d includes an AD converter that receives a detection output of the acceleration sensor 50 from the acceleration detection section 5 to be described later and performs A/D conversion of this detection output. Moreover, the gravity determination section 1d determines the gravity force based on the magnitude of an acceleration applied to the camera 10, based on the A/D-converted detection output of the acceleration sensor 50.

The acceleration detection section 5 detects the acceleration applied to the camera 10. In the acceleration detection section 5, in order to detect the longitudinal direction of the camera 10, the direction perpendicular thereto, and the like, the acceleration sensors 50 (see FIG. 3A) are disposed at three places (see FIG. 3D), respectively, to detect the acceleration. In the acceleration detection section 5, the acceleration sensor 50 is connected to the comparator 5a that determines whether or not the detection output from the acceleration sensor 50 is greater than a predetermined value. The power consumption of the comparator 5a is extremely small, i.e., in the order of 10 µA. The output of the comparator 5a is connected to the image processing and control section 1 so as to be able to perform interrupt processing. Moreover, the detection output (analog) of the acceleration sensor 50 is connected to the AD converter of the gravity determination section 1d as described above.

The vibration of the camera 10 is detected using the acceleration that is detected by the acceleration detection section 5, and a camera shake in the imaging section 2 is prevented by means of a non-illustrated vibration-proof mechanism. Moreover, the tilt state of the camera 10 is determined using a detection result of the acceleration detection section 5, and the detection result is used in power supply control as described later. Moreover, the detection result is also used in determining whether or not the camera 10 is held firmly. Furthermore, the acceleration detection section 5 is capable of detecting the direction of the gravity force in addition to the acceleration. The direction of the gravity force can be used in determining whether or not the camera 10 is positioned in vertical composition or horizontal composition. The detail of the acceleration detection section 5 will be described later using FIGS. 3A to 3D.

The tilt detection section 7 detects a tilt state of the camera 10. The structure of the tilt detection section 7 will be described later using FIGS. 2A, 2B. The operation determination section 6 determines the operation states of operating members, such as a release button, a zoom button, a reproduction button, and a menu button, provided in the camera 10. In a menu mode, various modes, for example, such as a moving image shooting mode, and a still image shooting mode, can be set.

The clocking section 9 outputs date and time information. The recording section 4 is a recording medium for recording image data. After the operation determination section 6 determines that an operation to instruct shooting has been performed, the image processing and control section 1 records image data and the shooting date and time information associated with this image data in the recording section 4. This is for allowing image management to be based on the shooting date and time.

The display section 8 comprises a display device, such as an LCD monitor, disposed on the back face or the like of the camera 10. Moreover, the display section 8 is capable of displaying a live view of an object image in a moving image based on the image data from the imaging section 2, and is also capable of reproducing a captured image that is recorded in the recording section 4. The touch panel 8b is disposed on the surface of the display section 8 so as to be able to detect a touch of a finger or the like of the photographer. When the camera 10 is set to the menu mode, a menu screen is displayed on the display section 8, where a shooting mode can be set by touching the displayed menu, for example, such as the "moving image shooting" mode or the "still image shooting" mode. Moreover, if the reproduction mode is selected, a desired image can be enlarged and displayed by touching the desired image among the captured images displayed in a list. The detail of the touch panel 8b will be described later using FIGS. 4A, 4B.

Figure 2A:
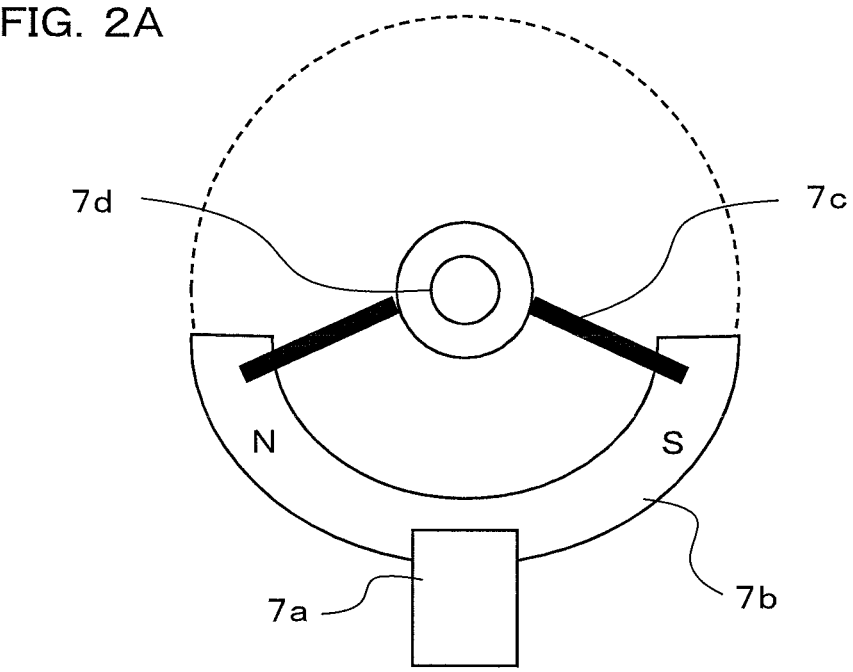
Figure 2B:
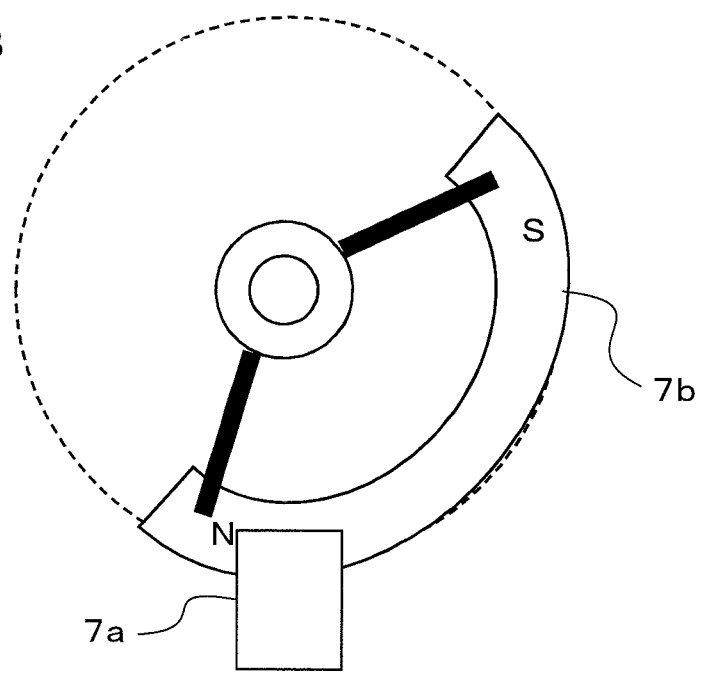

Next, the tilt detection section 7 detecting a tilt state of the camera 10 is described using FIGS. 2A, 2B. While there are various kinds of sensors detecting a tilt, one example shown in FIGS. 2A, 2B is the one wherein a permanent magnet is caused to always face the gravity direction and this magnet is detected by a hall element. That is, a permanent magnet 7b is supported by a support arm section 7c, and the support arm section 7c rotates freely about an axis 7d. The permanent magnet 7b pivots about the axis 7d so as to face the gravity direction. The hall element 7a is disposed in the pivoting path of the permanent magnet 7b, and a change in the magnetic field of the permanent magnet 7b is detected by the hall element 7a.

If the attitude of the camera 10 is in the horizontal state (attitude of a horizontal composition), the permanent magnet 7b is positioned as shown in FIG. 2A, while if the camera 10 is tilted, the permanent magnet 7b is tilted as shown in FIG. 2B. The tilt state of the permanent magnet 7b is detected by the hall element 7a, thereby the attitude of the camera 10 is detected, and it can be determined whether the camera 10 is in the attitude of the vertical composition or in the attitude of the horizontal composition or the like.

Figure 3A:
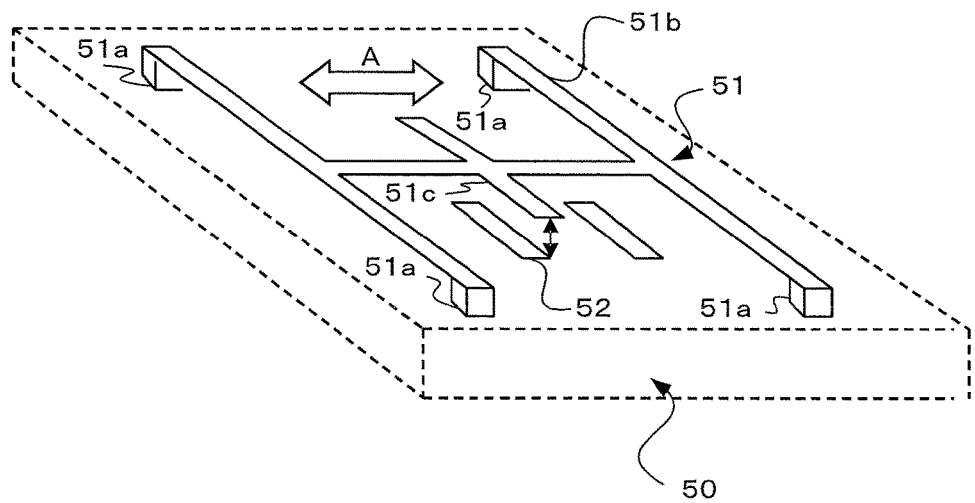
Figure 3B:
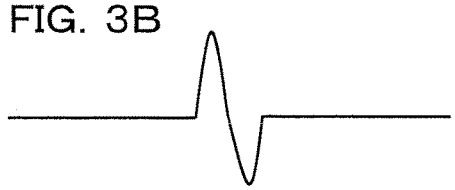

Next, the acceleration detection section 5 that detects the acceleration applied to the camera 10 is described using FIGS. 3A, 3B. The acceleration sensor 50 comprises a metal section 52 on a chip surface and a bridged metal section 51 as shown in FIG. 3A. The metal section 51 comprises four base points 51*a*, an H-shaped bridge section 51*b* held by the base points 51*a*, and a detection section 51*c* facing the metal section 52. The acceleration sensor 50 detects the capacitance of a capacitor including the detection section 51*c* and the metal section 52. As the metal section 51 moves in the direction of an arrow A in FIG. 3A, the capacitance of the capacitor varies, and therefore by calculating this variation, the acceleration in the direction of the arrow A can be detected.

Figure 3C:
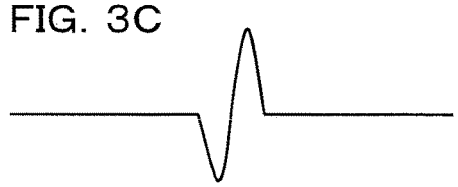

Moreover, the detection output of the acceleration sensor 50 varies depending on the direction of the applied acceleration as shown in FIGS. 3B, 3C. That is, the direction of the acceleration differs between when a plus output appears first and then changes to a minus output as shown in FIG. 3B and when a minus output appears first and then changes to a plus output as shown in FIG. 3C. For this reason, the direction of the acceleration can be also known by detecting a change in the signal.

Figure 3D:
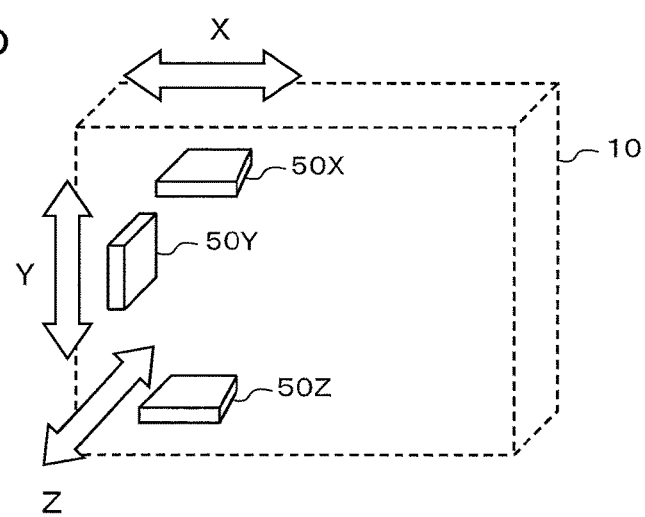

The acceleration sensors 50 described above are disposed at three positions in the camera 10, as shown in FIG. 3D. That is, an acceleration sensor 50X detecting the acceleration in the longitudinal direction (X direction) of the camera 10, an acceleration sensor 50Y detecting the acceleration in the direction (Y direction) perpendicular to the longitudinal direction of the camera 10, and an acceleration sensor 50Z positioned on the left side of the camera 10 and detecting the acceleration in the optical axis direction (Z direction) are disposed to detect the acceleration along the respective directions.

Figure 4A:
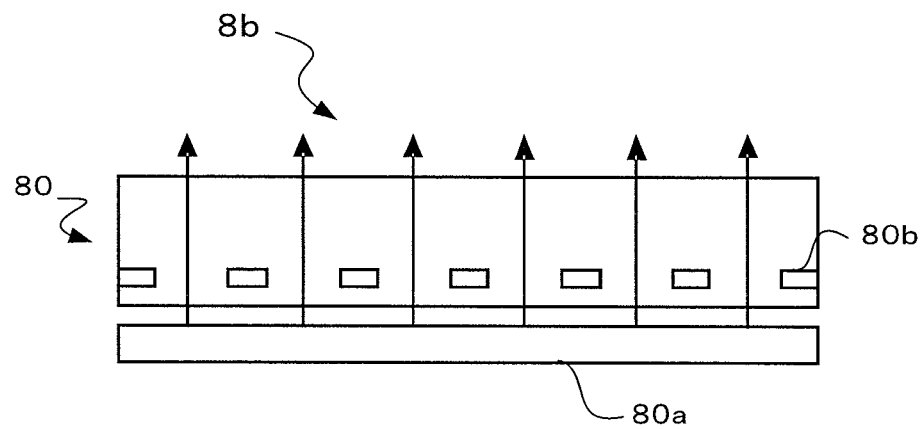
Figure 4B:
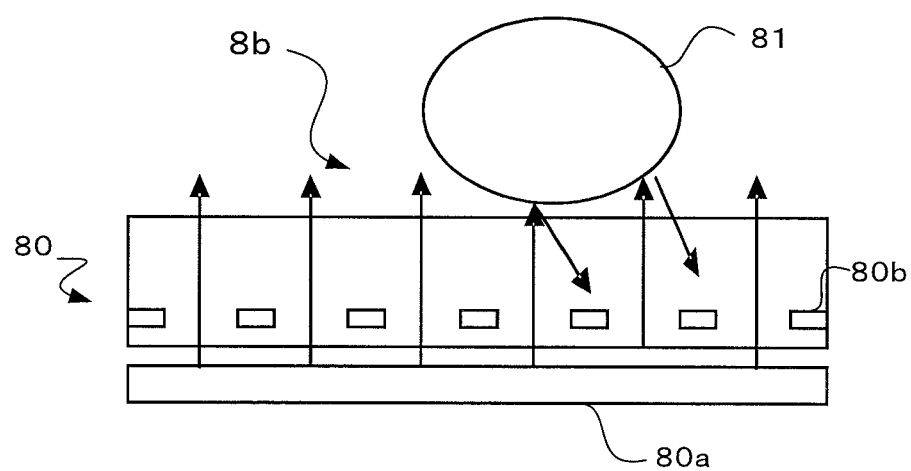

Next, the structure of the touch panel 8*b* is shown in FIGS. 4A, 4B. The touch panel 8*b* is a photoelectric sensor touch panel. In the touch panel 8*b*, as shown in FIG. 4A, photosensors 80*b* are two-dimensionally arranged at predetermined intervals inside a liquid crystal 80, and a backlight 80*a* is provided on the back face of the liquid crystal 80. Note that this photoelectric sensor touch panel is not disposed on the liquid crystal but is integrally incorporated into the liquid crystal. Other than the photoelectric sensor type, other touch panel, such as a resistive film type, may be used as the touch panel.

As a finger 81 of a user approaches the touch panel 8*b*, as shown in FIG. 4B, the light from the backlight 80*a* is reflected by the finger 81 and then detected by the photosensor 80*b*. A touch position can be detected by determining which photosensor 80*b* detects the reflected light from the finger 81.

Figure 5A:
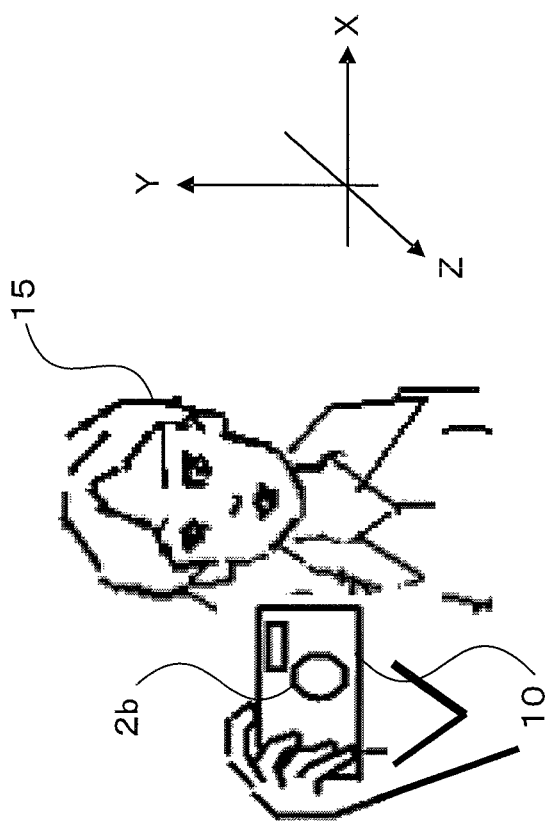
Figure 5B:
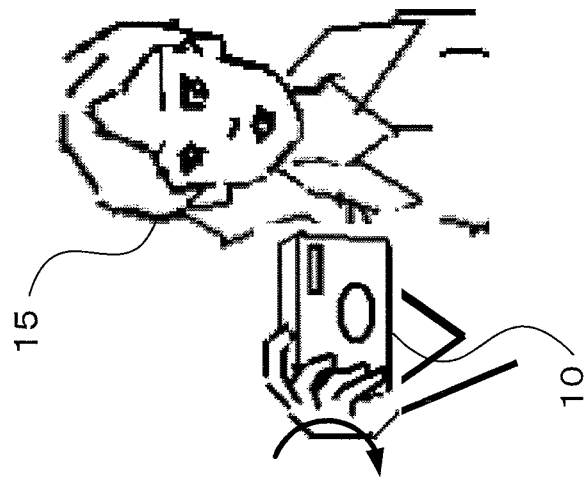

Next, how to turn on power when imaging is started in this embodiment is described using FIGS. 5A, 5B. FIG. 5A shows the state when a photographer 15 has set the camera 10 to shoot. In this case, the photographer 15 has horizontally set the camera 10 (attitude of a horizontal composition) with the photographic lens 2*b* facing the object side and the back face side of the camera 10 facing the photographer 15. As for the X direction, Y direction, and Z direction at this time, as shown in the view, the X direction is the same as the longitudinal direction of the camera 10, the Y direction is perpendicular to the longitudinal direction and is also the center-of-gravity direction, and the Z direction is the optical axis direction of the photographic lens 2*b*.

In the state where the photographer 15 sets the camera 10, as shown in FIG. 5A, when the photographer 15 moves the camera 10 forward and backward as if causing the camera 10 to bow, the power of the camera 10 is turned on in this embodiment. That is, when the camera 10 is tilted forward first and subsequently restored to the original position, a movement at this time is detected by the acceleration detection section 5 and based on this detection result the power of the camera 10 is turned on.

FIG. 6 shows temporal changes in the detection outputs of the acceleration sensors 50X, 50Y and 50Z of the acceleration detection section 5. When the photographer 15 sets the camera 10, the acceleration sensor 50Y is affected by the gravity force and outputs a detection signal of approximately 1 G while the detection signals of the other acceleration sensors 50X, 50Z are approximately zero and any of these detection signals is superimposed by a signal due to a camera shake.

At the timing of a time instant t1, when the photographer 15 tilts the camera 10 forward, as shown in FIG. 6, the detection output of the acceleration sensor 50Z abruptly increases to become a value equal to approximately 3 G. Moreover, the detection output of the acceleration sensor 50Y abruptly decreases. Then, at the timing of a time instant t2, when the photographer 15 restores the tilt of the camera 10 and sets the camera 10, the detection output of the acceleration sensor 50Z decreases to the minus side once and then returns to the original level. Moreover, the detection output of the acceleration sensor 50Y increases to a value equal to approximately 3 G once and then returns to a value equal to approximately 1 G that is the original level.

In this manner, by detecting the signal changes of the acceleration sensors 50Y, 50Z, it is possible to determine whether or not the camera 10 is tilted forward from the state of being set and thereafter returns to the original position where the camera 10 was set. In this embodiment, even in the power-off state, power is continuously supplied to the comparator 5*a* of the acceleration detection section 5. Then, if the acceleration signal equal to approximately 3 G, which is generated in tilting the camera 10, is generated, a signal is output from the comparator 5*a* to the image processing and control section 1 and power is supplied to whole of the gravity determination section 1*d* and the acceleration detection section 5 by the second power supply control section 1*b*. The gravity determination section 1*d* precisely detects changes in acceleration and determines the motion of the camera 10 so as to determine whether or not to turn on power.

Figure 7:
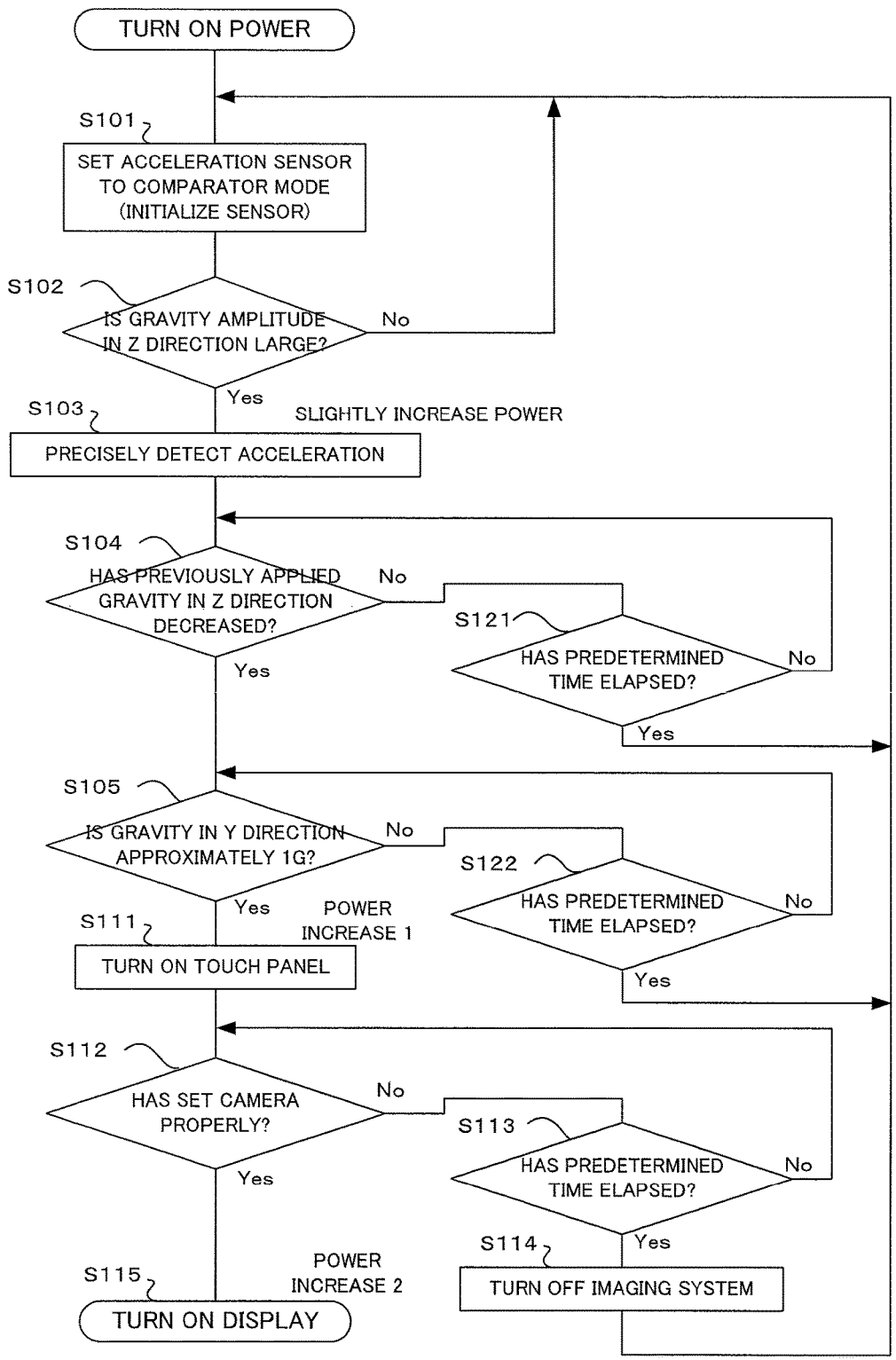
FIG. 7 is a flowchart showing an operation to turn on power of the camera according to the first embodiment of the present invention.

Next, the operation to turn on power in this embodiment is described using a flowchart shown in FIG. 7. Steps S101, S102 in the flow shown in FIG. 7 are not executed by the image processing and control section 1 but are executed in hardware. First, the acceleration sensor is set to a comparator mode to initialize the sensor (S101). In this Step, when the camera 10 becomes in the power-off state, power is supplied to the comparator 5*a* in the acceleration detection section 5 to set the comparator mode in which the comparator 5*a* compares a detection signal of the acceleration sensor 50 with a determination value.

Subsequently, whether or not the gravity amplitude in the Z direction is large is determined (S102). Here, whether or not the level of the acceleration signal output from the acceleration sensor 50Z exceeds approximately 3 G is determined by the comparator 5*a*. If the gravity amplitude is not large as a result of this determination, the flow returns to S101.

If the gravity amplitude is large as a result of the determination in Step S102, then power is slightly increased to precisely detect the acceleration (S103). Here, power supply to the entire acceleration detection section 5 and the gravity determination section 1*d* is started by the second power supply control section 1*b*. That is, in Step S102, only a fact that an acceleration exceeding approximately 3 G has been applied is known but a change in the value of this acceleration is unknown, and then the acceleration is precisely detected in the A/D conversion section of the gravity determination section 1d.

If the acceleration is precisely detected, and then whether or not the previously applied gravity force of Z has decreased is determined (S104). As apparent from the graph of signal changes shown in FIG. 6, at the timing t1, when the camera 10 is tilted forward, the signal output of the acceleration sensor 50Z increases, and when the signal output reaches a peak, it changes to decrease. In this Step S104, the signal output of the acceleration sensor 50Z is A/D-converted, and whether or not the resultant value has exceeded a peak is determined.

If the resultant value has not decreased yet as a result of the determination in Step S104, then whether or not a predetermined time has elapsed is determined (S121). Here, it is determined whether or not the time after the detection of a large gravity amplitude in the Z direction in Step S102 has reached the predetermined time. This predetermined time shall be a time, e.g., approximately one second, sufficient for the photographer 15 to tilt the camera 10 forward. The system waits for the predetermined time to elapse, and meanwhile if the gravity force did not decrease, then it is interpreted that the photographer 15 did not perform the operation for turning on power, and the flow returns to Step S101 to return to the power-off state.

If the gravity force decreased as a result of the determination in Step S104, then whether or not the gravity in the Y direction is approximately 1 G is determined (S105). Here, the signal output from the acceleration sensor 50Y is A/D-converted, and whether or not the resultant value is equal to approximately 1 G is determined. As shown in FIG. 6, when the camera 10 is restored to the original attitude (the attitude when the photographer 15 set the camera 10) at a timing t2 and is settled, then the value of the acceleration sensor 50Y becomes equal to approximately 1 G. This Step S105 determines whether or not the camera 10 has returned to the state where the photographer 15 set the camera 10.

If the value of the acceleration sensor 50Y has not yet become approximately 1 G as a result of the determination in Step S105, then whether or not a predetermined time has elapsed is determined (S105). Here, it is determined whether or not the predetermined time has elapsed since clocking is started at a time point when the gravity force in the Z direction started to decrease in Step S104. This predetermined time shall be a time, e.g., approximately one second, sufficient for the photographer 15 to restore the camera 10 that was tilted forward. The system waits for the predetermined time to elapse, and meanwhile if the gravity force has not decrease, then it is interpreted that the photographer 15 did not perform the operation of turning on power, and the flow returns to Step S101 to return to the power-off state.

If the gravity in the Y direction becomes approximately 1 G as a result of the determination in Step S105, then power increase 1 is performed to turn on the touch panel (S111). Here, power is supplied to the touch panel 8b by the third power supply control section 1c so as to detect a touch signal from the touch panel 8b. Moreover, power supply to the imaging system is started by the first power supply control section 1c so as to start an imaging operation. Note that, in this embodiment, assuming that the camera 10 does not include a movable part, such as a zoom lens, whose contour changes in changing the focal length, and it is also preferable that the zoom position is set to the wide side where the field angle is wide and that the focus is initialized to a fixed-focus position.

Subsequently, whether or not the photographer has set the camera 10 properly is determined (S112). Here, whether or not the photographer 15 holds the camera 10 is determined. This is because if the camera 10 just moved forward and backward and the photographer 15 has not set the camera 10 properly, then turning the power on would result in wasteful power consumption. The determination of whether or not the photographer 15 has set the camera 10 properly will be described later using FIGS. 8A, 8B.

If the photographer 15 has not set the camera 10 properly as a result of the determination in Step S112, then whether or not a predetermined time has elapsed is determined (S113). Here, it is determined whether or not the predetermined time has elapsed since clocking is started at a time point when the gravity in the Y direction became equal to 1 G in Step S105. This predetermined time shall be a time sufficient for the photographer 15 to set the camera 10 properly after restoring the camera 10 to the original position, for example approximately 5 seconds for the photographer to attach his/her left hand to the camera 10 after setting the camera 10 with his/her right hand. The system waits for the predetermined time to elapse, and if the photographer has not set the camera 10 properly even after the predetermined time, then the imaging system is turned off (S114). Here, the power supply to the imaging system is turned off by the first power supply control section 1a. When the imaging system is turned off, the flow returns to Step S101 to return to the power-off state.

If the photographer 15 has set the camera 10 properly as a result of the determination in Step S112, then power increase 2 is performed to turn on the display, resulting in the power-on state (S115). By performing the power increase 2, the camera 10 becomes in the power-on state and the normal camera operation can be performed.

In this manner, according to the power-on flow in this embodiment, power is continuously supplied to the comparator 5a of the acceleration detection section 5 even in the power-off state so as to enable determination of an intentional operation of the photographer 15, i.e., determination of whether or not the camera 10 is tilted forward. When a detection signal is output from the comparator 5a, the output signal of the acceleration detection section 5 is A/D-converted and the behavior of the output signal is precisely detected to determine the motion of the camera 10. If an intentional operation by the photographer 15 (i.e., the fact that the camera 10 is tilted forward and thereafter restored to the original position) is determined, power is turned on.

An operation to return to the original position subsequently after the motion to tilt the camera 10 forward will not occur in daily life unless the photographer 15 intentionally performs. Accordingly, in this embodiment, a malfunction that causes the power-off state to turn into the power-on state can be prevented.

Moreover, in this embodiment, even when it has been detected that the camera 10 is restored to the original position after being tilted forward, whether or not the photographer 15 has set the camera 10 properly (see S112) is further determined and thus the malfunction can be further prevented.

Note that, while in this embodiment the gravity amplitude in the Z direction is detected in Step S102, the comparator 5a may be of a type to detect all the X, Y and Z directions instead of the type to detect only the Z direction. Although in this case the amplitudes in all the X, Y and Z directions would be detected, the acceleration may be detected for each direction in Step S103 and then be determined in Step S104.

Moreover, in this embodiment, if it is detected in Step S105 that the gravity in the Y direction becomes approximately 1 G, then whether or not the photographer 15 has set the camera 10 properly is further determined in Step S112. If the gravity in the Y direction becomes approximately 1 G, it is however interpreted that the photographer 15 tilted the camera 10 forward and subsequently restored the camera 10 to the original position, in other words that the photographer 15 has set the camera 10. Consequently, at this point, the power increase 2 may be immediately performed to turn on the display so that the camera 10 becomes in the shooting state.

Figure 8A:
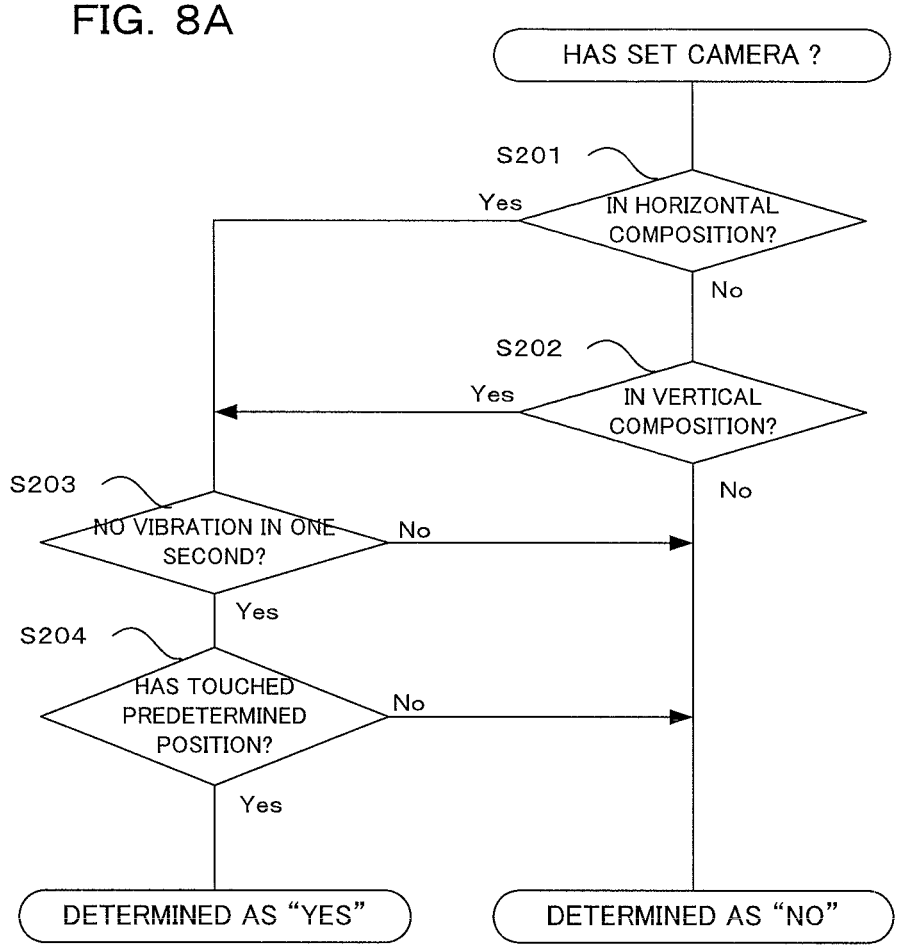
Figure 8B:
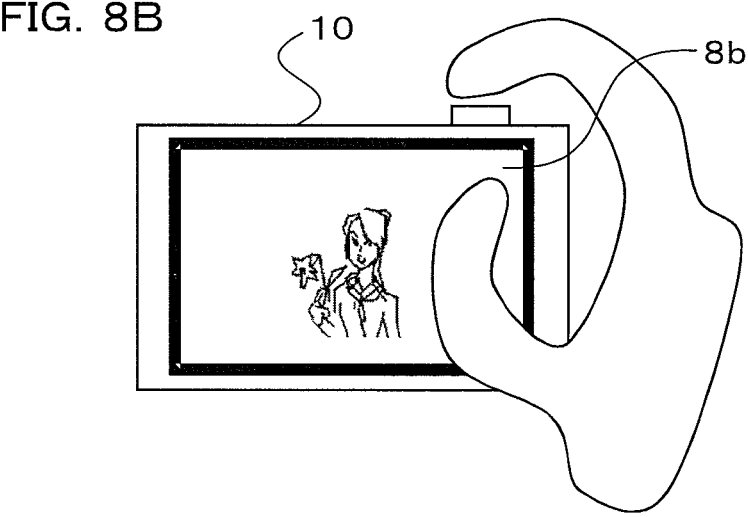

Next, the determination of whether or not the photographer has set the camera in Step S112 is described using FIGS. 8A, 8B. Entering a flow shown in FIG. 8A, whether or not the camera 10 is in the horizontal composition is first determined (S201), and if the camera 10 is not in the horizontal composition, then whether or not the camera 10 is in the vertical composition is determined (S202). Whether the camera 10 is in the horizontal composition or in the vertical composition is determined based on the output of the acceleration detection section 5. Note that, other than the acceleration detection section 5, for example a gravity detector or the like may be provided so as to determine the composition using its output.

If it has been determined as "Yes" (i.e., if the camera 10 is in the horizontal composition or in the vertical composition) in Step S201 or Step S202, then it is determined whether or not there is no vibration for one second (S203). This Step determines whether or not there is no vibration for one second based on the detection output of the acceleration detection section 5. Note that one second is just illustrative only and this time may be longer than one second or may be shorter. In other words, there should be no vibration for a time of such an order that the photographer 15 may have set the camera 10 properly.

If there is no vibration for one second as a result of the determination in Step S203, then whether or not the user has touched a predetermined position is determined (S204). This Step determines based on the detection output from the touch panel 8b. In the case of the horizontal composition, as shown in FIG. 8B, since the upper right of the camera 10 is held, whether or not there is a detection output corresponding to this portion is determined. Moreover, since this portion is also held in the case of the vertical composition, determination is made similarly based on the detection output of the touch panel 8b.

If the predetermined position has been touched as a result of the determination in Step S204, it is determined as "Yes". That is, in this case, since there is no vibration during the predetermined time in the horizontal composition or in the vertical composition and the photographer has been holding the predetermined position, it is determined that the photographer has set the camera properly. On the other hand, if the camera 10 is neither in the horizontal composition nor in the vertical composition as a result of the determination in Step S202, or if there is vibration in Step S203, or if the photographer has not yet touched a predetermined position as a result of the determination in Step S204, it is determined as "No". In this case, the photographer has not set the camera properly.

In this manner, in the flow shown in FIG. 8A, it is possible to determine whether or not the photographer firmly holds and sets the camera. As described above, in the power-on flow, if the photographer sets the camera, the display is turned on to start the normal camera operation mode.

As described above, in the first embodiment of the present invention, an output equal to or greater than the gravity force is continuously determined by the acceleration detection section, and if the output equal to or greater than the gravity force is detected (S102→Yes), then upon detection of a vertical attitude change when the photographer sets the camera while viewing the display section 8 (S104→Yes, S105→Yes), power is turned on (power increase 1). Hence, power is turned on only by the operation when the photographer sets the camera, and in the other states the power will not be turned on due to a malfunction. That is, the power can be turned on only by making a vertical attitude change of the camera when the photographer sets the camera, and this attitude change will not occur in normal daily operations. Moreover, these operations may reflect the intention of the photographer because these are performed within a predetermined time. Since such operations are detected, the power will not be turned on due to a malfunction. Note that, in this embodiment, whether or not the operation is performed within a predetermined time is determined, but the present invention is not limited thereto, and a determination to regard a motion faster than a predetermined time as unnatural may be added.

Next, a second embodiment of the present invention will be described using FIGS. 9 to 12. In the first embodiment, power is turned on when it is detected that the photographer 15 tilted the camera 10 forward from the position where the photographer 15 set the camera 10 and subsequently restored the camera 10 to the original position. In the second embodiment, power is turned on if it is detected that the photographer 15 tilted the camera 10 not forward but laterally from the position where photographer 15 set the camera 10 and subsequently restored the camera 10 to the original position. The configuration in the second embodiment is the same as that of FIG. 1 of the first embodiment, and the flow shown in FIG. 7 just needs to be replaced with a flowchart shown in FIG. 11. The description is provided focusing on the different points.

FIGS. 9A, 9B show how to turn on the power of the camera 10 in the second embodiment. FIG. 9A is the same as FIG. 5A, showing when the photographer 15 has set the camera 10 to shoot. In the state where the photographer 15 sets the camera 10, as shown in FIG. 9A, if the photographer 15 reciprocates the camera 10 right and left once, the power of the camera 10 is turned on. That is, if the camera 10 is first tilted to either the left or right side and subsequently restored to the original position, then the motion at this time is detected by the acceleration detection section 5, and based on this detection result the power of the camera 10 is turned on.

FIG. 10 shows temporal changes in the detection outputs of the acceleration sensors 50X, 50Y and 50Z of the acceleration detection section 5. When the photographer 15 sets the camera 10, as with the first embodiment, the acceleration sensor 50Y is affected by these gravity force and outputs a detection signal of approximately 1 G while the detection signals of the other acceleration sensors 50X, 50Z are approximately zero and any of these detection signals is superimposed by a signal due to a camera shake.

At the timing of a time instant t11, if the photographer 15 tilts the camera 10 to the right or left side, as shown in FIG. 10, a detection output of the acceleration sensor 50X abruptly increases to become a value equal to approximately 3 G. Moreover, the detection output of the acceleration sensor 50Y abruptly decreases. Then, at the timing of a time instant t13, if the photographer 15 restores the tilt of the camera 10 and sets the camera 10, the detection output of the acceleration sensor 50X decreases to the minus side once and then returns to the original level. Moreover, the detection output of the acceleration sensor 50Y increases to a value equal to approximately 3 G once and then returns to a value equal to approximately 1 G that is the original level.

In this manner, by detecting the signal changes of the acceleration sensors 50X, 50Y, it is possible to determine whether or not the camera 10 is set and then tilted to the left or right side and thereafter returns to the position where the camera 10 was originally set.

Figure 11:
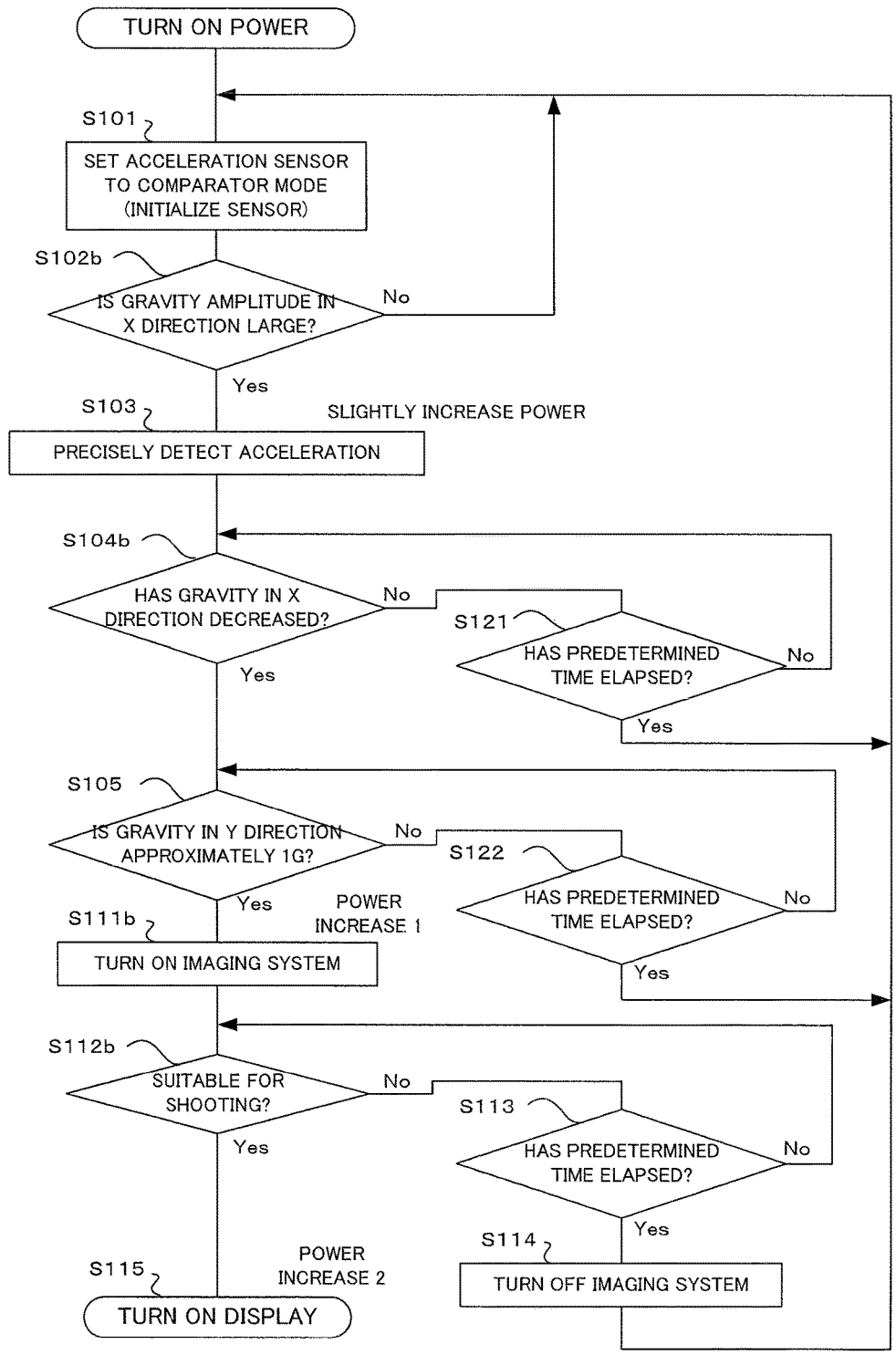
FIG. 11 is a flowchart showing an operation to turn on power of the camera according to the second embodiment of the present invention.

Next, the operation to turn on power in the second embodiment according to the present invention is described using the flowchart shown in FIG. 11. Since this power-on flowchart is the same as that in the first embodiment shown in FIG. 7 except that Step S102 is replaced with S102*b*, Step S104 with S104*b*, Step S111 with S111*b*, and Step S112 with S112*b*, the description is provided focusing on these different points.

Entering the power-on flow, if the acceleration sensor is set to the comparator mode (S101), then whether or not the gravity amplitude in the X direction is large is determined (S102*b*). Here, whether or not the output of the acceleration sensor 50X exceeds a value equal to approximately 3 is determined. As described using FIG. 10, since the acceleration in the X direction increases as the camera 10 is tilted to the right or left side, the determination here is whether or not the photographer 15 tilted the camera to turn on power.

If the gravity amplitude in the X direction is large as a result of the determination in Step S102*b*, then the acceleration is precisely detected (S103) to determine whether or not the gravity in the X direction has decreased (S104*b*). In this Step, the signal output of the acceleration sensor 50X is A/D-converted, and whether or not this value tends to decrease is determined. When the camera 10 is tilted to the right or left side and restored to the original position again, the signal output of the acceleration sensor 50X becomes a peak and thereafter decreases. Hence, in this Step, whether or not the signal output of the acceleration sensor 50X has passed the peak is determined.

If the gravity in the X direction decreased as a result of the determination in Step S104*b*, then whether or not the gravity in the Y direction becomes approximately 1 G is determined (S105). If the gravity in the Y direction is approximately 1 G as a result of this determination, then the imaging system is turned on (S111*b*). If the gravity in the Y direction is approximately 1 G, it is interpreted that the camera has returned to the original position, i.e., the position where the photographer set the camera 10, and then in this Step, power is supplied to the imaging system by the first power supply control section 1*a*.

If the imaging system is turned on, then whether or not the current state is suitable for shooting is determined (S112*b*). In the determination of whether or not the current state is suitable for shooting, the determination of whether or not the periphery of the camera is dark is made based on image data from the imaging section 2, for example. In the case where the camera remains in a bag or a case, the periphery is dark and such a case is determined as unsuitable for shooting.

If the periphery of the camera 10 is suitable for shooting as a result of the determination in Step S112*b*, then the power increase 2 is performed to turn on the display (S115). By performing the power increase 2, the camera 10 becomes in the power-on state and the normal camera operation can be performed.

In this manner, according to the power-on flow in this embodiment, as with the first embodiment, power is continuously supplied to the comparator 5*a* of the acceleration detection section 5 even in the power-off state so as to enable determination of an intentional operation performed by the photographer 15 (i.e., determination of which side the photographer 15 tilted the camera 10, left or right). When the detection signal is output from the comparator 5*a*, the output signal of the acceleration detection section 5 is A/D-converted and the behavior of the output signal is precisely detected to determine the motion of the camera 10. If an intentional operation performed by the photographer 15 is determined (i.e., if it is determined that the camera was tilted and thereafter restored to the original position), power is turned on.

Such a motion to tilt the camera 10 and subsequently restore it to the original position will not occur in daily life unless the photographer 15 intentionally performs. Hence, in this embodiment, a malfunction that causes the power-off state to turn into the power-on state can be prevented.

Moreover, in this embodiment, because whether or not the current state is suitable for shooting is further determined even after detecting the fact that the camera has restored to the original position after it was tilted (see S112*b*), a malfunction can be further prevented.

Figure 12:
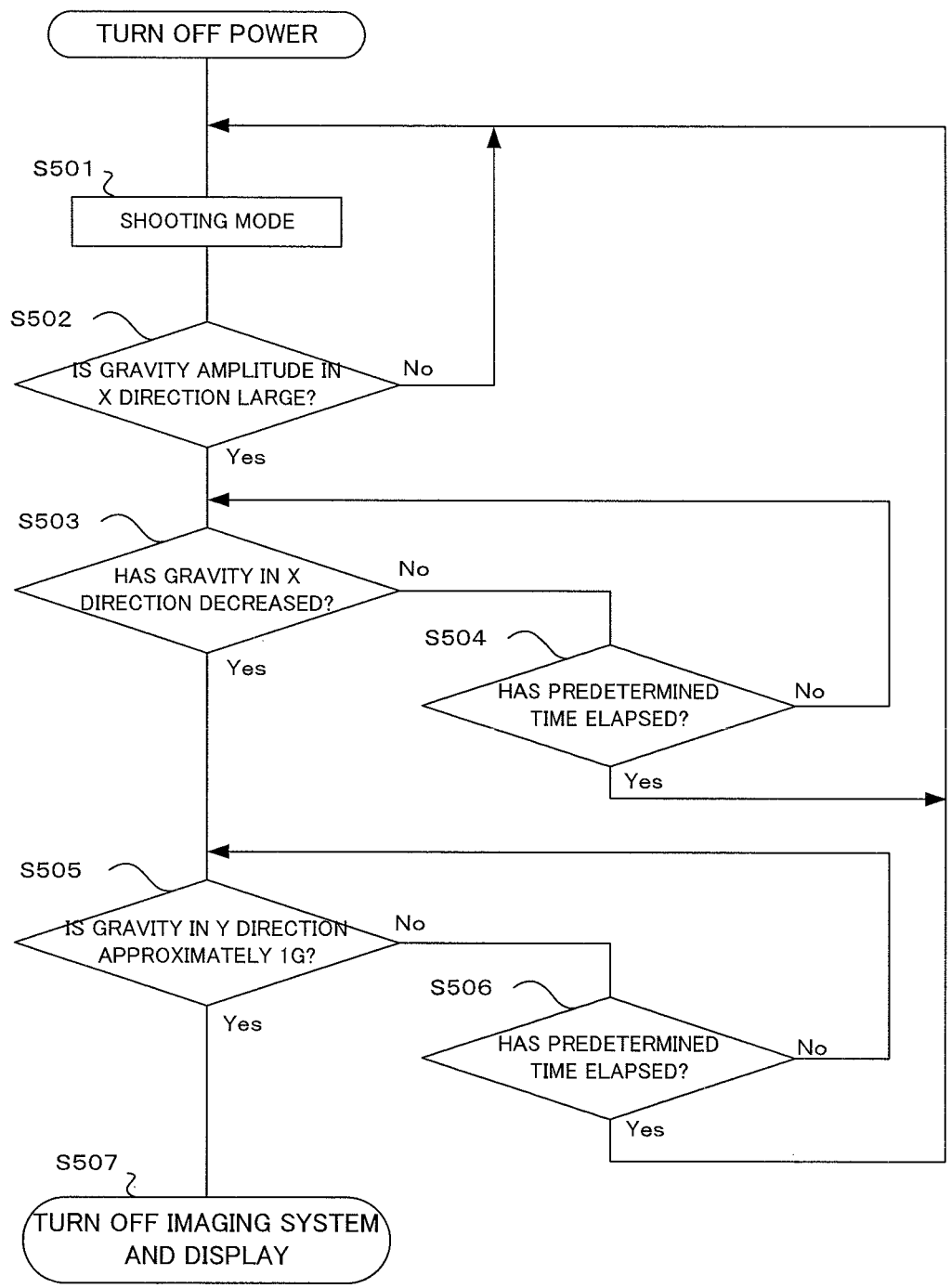
FIG. 12 is a flowchart showing an operation to turn off power of the camera according to the second embodiment of the present invention.

Next, the power off in this embodiment is described using a flowchart shown in FIG. 12. When the photographer 15 performs an operation to tilt the camera 10, power is turned off. That is, the power off, as with the power on, can be performed by an operation to tilt the camera 10.

First, a shooting mode is executed (S501). Here, when an object image is observed with the display section 8 and the composition is determined, the image data is recorded in the recording section 4 by a release operation. Upon execution of the shooting mode, it is determined at a predetermined timing whether or not the gravity amplitude in the X direction is large (S502). Here, the signal output of the acceleration sensor 50X is A/D-converted and it is determined in the gravity determination section 1*d* whether or not the amplitude has increased. If the amplitude has not increased as a result of this determination, the flow returns to Step S501 to continuously execute the shooting mode.

On the other hand, if the gravity amplitude in the X direction becomes large as a result of the determination in Step S502, then whether or not the gravity in the X direction has decreased is determined (S503). As described above, if the camera 10 is tilted to either the left or right side from the position where the photographer set the camera 10 and is subsequently restored to the original position, the signal output of the acceleration sensor 50X increases and then decreases. In Steps S502, S503, it is determined whether the camera 10 is tilted to either the left or right side and subsequently restored to the original position.

If the gravity in the X direction did not decrease as a result of the determination in Step S503, then whether or not a predetermined time has elapsed is determined (S504). Here, it is determined whether a time after the gravity amplitude restored in the X direction increased in Step S502 has reached the predetermined time. The predetermined time shall be a time sufficient for the photographer 15 to tilt the camera 10 to either the left or right side. The system waits for the predetermined time to elapse, and meanwhile if the gravity did not decrease, then it is interpreted that the photographer 15 did not perform the operation to turn on power, and the flow returns to Step S501 to continuously execute the shooting mode.

If the gravity in the X direction decreased as a result of the determination in Step S503, then it is determined whether or not the gravity in the Y direction becomes approximately 1 G (S505). If the gravity in the Y direction has not yet become approximately 1 G as a result of this determination, then whether or not a predetermined time has elapsed is determined (S506). Here, clocking is started at a time point when the gravity in the X direction decreased in Step S503. The predetermined time shall be a time sufficient for the camera 10 to be tilted to the left or right side and restored to the original position. It is determined whether or not the gravity in the Y direction becomes approximately 1 G until the predetermined time elapses, and if the predetermined time has elapsed without the gravity in the Y direction becoming approximately 1 G, the flow returns to Step S501 to continuously execute the shooting mode. This is because it has been determined that the photographer 15 did not perform the operation to turn on power.

If the gravity in the Y direction becomes approximately 1 G as a result of the determination in Step S505, the imaging system and the display are turned off to set the power-off state (S507). In the power-off state, the power supply except for the comparator 5a and the like is stopped to prevent consumption of a battery power supply.

In this manner, in the power-off flow, as in the power-on state, by tilting the camera 10 to either the left or right side, the power of the camera 10 can be turned off. For this reason, purposely turning off of a power switch can be omitted and thus the power can be immediately turned off.

As described above, also in the second embodiment of the present invention, as with the first embodiment, an output equal to or greater than the gravity force is continuously determined by the acceleration detection section, and if an output equal to or greater than the gravity force is detected (S102b→Yes), then upon detection of a vertical attitude change when the photographer sets the camera while viewing the display section 8 (S104b→Yes, S105→Yes), power is turned on (power increase 1). Hence, power is turned on only by the operation (to tilt the camera to either the left or right side) when the photographer sets the camera, and in the other states the power will not be turned on due to a malfunction. That is, the power can be turned on only by making a vertical attitude change of the camera when the photographer sets the camera, and the power will not be turned on due to a malfunction, because this attitude change will not occur in normal daily operations, also these operations are performed within a predetermined time, and thus these operations may reflect the intention of the photographer. Note that, also in this embodiment, as with the first and second embodiments, whether or not the operation is performed within a predetermined time is determined, but the present invention is not limited thereto, and a determination to regard a motion faster than the predetermined time as unnatural may be added.

Next, a third embodiment of the present invention will be described using FIGS. 13 to 17. In the first and second embodiments of the present invention, when a specific motion, such as tilting the camera forward or tilting the camera right and left, is performed, the imaging system is turned on so that the photographer can shoot by operating the release button. In this embodiment, when the camera 10 is restored to the original position after being tilted to the right or left side, rapid shooting or continuous shooting is started. The configuration of this embodiment is the same as that of FIG. 1 of the first embodiment, and the flow shown in FIG. 7 just needs to be replaced with the one shown in FIG. 13. Then, the description is provided focusing on the different points.

In this embodiment, as for the operation to turn on power, power is turned on at the timing when the camera is restored after being tilted to either of the left or right side, in the operation in the second embodiment shown in FIG. 9. That is, in the waveform of the acceleration detection signal shown in FIG. 10, upon detection of the timing t12 when the acceleration sensor 50X changes from increase to decrease, power is turned on at this time point (power increase 2) and power is supplied to the imaging system. Moreover, shooting is started from the timing t12.

Figure 13:
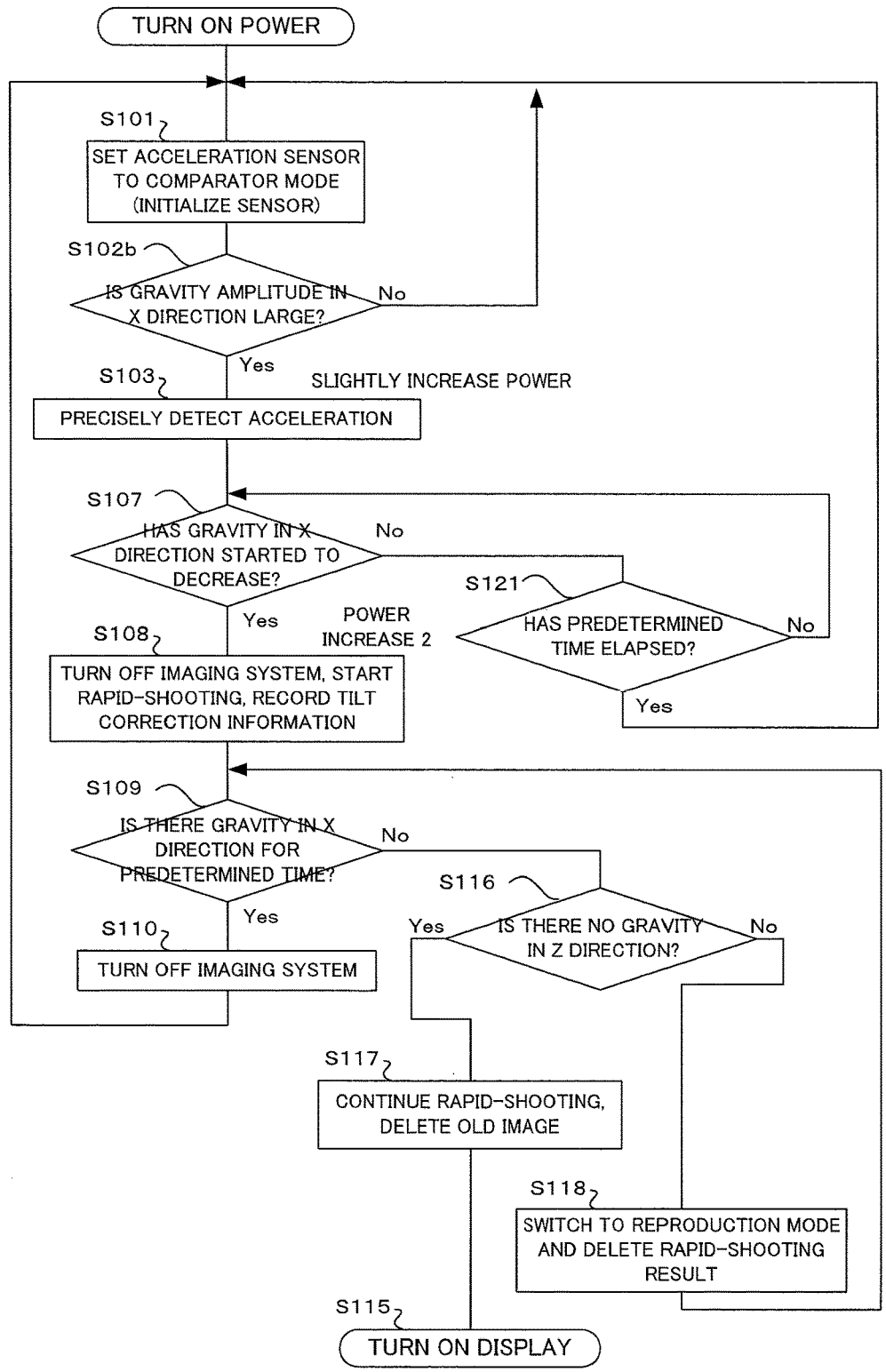
FIG. 13 is a flowchart showing an operation to turn on power of a camera according to a third embodiment of the present invention.

The operation of the camera 10 of this embodiment is described using a flowchart shown in FIG. 13. Entering the power-on flow in this embodiment, as with the second embodiment, the acceleration sensors 50X to 50Z are first set to a comparator mode and the sensors are initialized (S101). Subsequently, whether or not the gravity amplitude of the acceleration sensor 50X is large is determined (S102b). If the gravity amplitude is not large as a result of this determination, the flow returns to Step S101. Steps S101, S102b are executed in hardware as with the first and second embodiments.

If the gravity amplitude of the acceleration sensor 50X is large as a result of the determination in Step S102b, then the acceleration is precisely detected (S103). Here, as with the first and second embodiments, the acceleration is detected by the gravity determination section 1d based on the signal output from the acceleration sensor 50X. Subsequently, whether or not the gravity in the X direction has started to decrease is determined (S107). Here, whether or not the signal output of the acceleration sensor 50X starts to decrease is determined. The position to start to decrease corresponds to a position where the camera 10 is tilted to either the left or right side and subsequently stats to return from the most tilting angle.

If the gravity in the X direction has not decreased yet as a result of the determination in Step S107, then whether or not a predetermined time has elapsed is determined (S121). Here, it is determined whether or not a predetermined time has elapsed from the timing when the gravity amplitude in the X direction is determined as large in Step S102b. The predetermined time shall be a time sufficient for the camera 10 to tilt to the most tilting angle when the photographer tilted the camera 10 to either the left or right side. If the predetermined time has not elapsed as a result of the determination in this Step S121, the flow returns to Step S107, while if the predetermined time has elapsed, the flow returns to Step S101 to enter the power-off state.

If the gravity in the X direction started to decrease as a result of the determination in Step S107, then the imaging system is turned on, the rapid shooting is started, and tilt correction information is recorded (S108). Here, power is supplied to the imaging system by the first power supply control section 1a (power increase 2), the rapid shooting is started by the imaging section 2, and the tilt correction information about a tilt acquired from the acceleration detection section 5 is recorded together with the image data of the rapid shooting.

If the rapid shooting and the like are started, then it is determined whether or not there is the gravity for a predetermined time in the X direction (S109). Here, since the camera 10 is tilted to either the left or right side and tilted to the most tilting angle, it is determined whether or not there is a signal output equal to the gravity force from the acceleration sensor 50X even after the predetermined time. If there is the gravity in the X direction even after the predetermined time as a result of this determination, then the imaging system is turned off (S110). In this case, since the camera 10 is just tilted to either the left or right side and the photographer has not intentionally turned on power, the imaging system is turned off. After turning off the imaging system, the flow returns to Step S101 to enter the power-off state.

On the other hand, if there is no gravity in the X direction after the predetermined time as a result of the determination in Step S109, then it is determined whether or not there is no gravity in the Z direction (S116). Here, the determination is made based on the signal output of the acceleration sensor 50Z. If there is the gravity in the Z direction as a result of this determination, the rapid shooting is continued and the old image is deleted (S117). Since there is no acceleration equal to the gravity in the X direction in Step S109 and also it has been detected that there is no acceleration equal to the gravity also in the Z direction in Step S116, in this case, the camera 10 has returned to the original position where the photographer set the camera. In this case, the rapid shooting that was started in Step S108 is continued, and if the memory consumption exceeds the memory capacity, the images are deleted in the order from the older one. Subsequently, as with the first and second embodiments, the display is turned on.

On the other hand, if there is an acceleration equal to the gravity in the Z direction as a result of the determination in Step S116, then the mode is switched to the reproduction mode and the rapid shooting result is deleted (S118). There is the gravity in the Z direction because the photographer has tilted the camera 10 forward and is viewing the display section 8. Then, the mode is switched to the reproduction mode and the rapid shooting result is deleted, and the flow returns to Step S109.

Figure 14A:
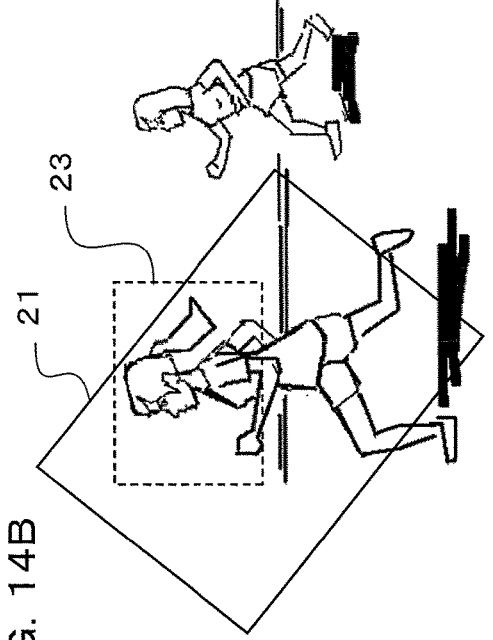
FIGS. 14A to 14D are views illustrating how to create a continuous image by trimming continuously shot images in the camera according to the third embodiment of the present invention.
Figure 14B:
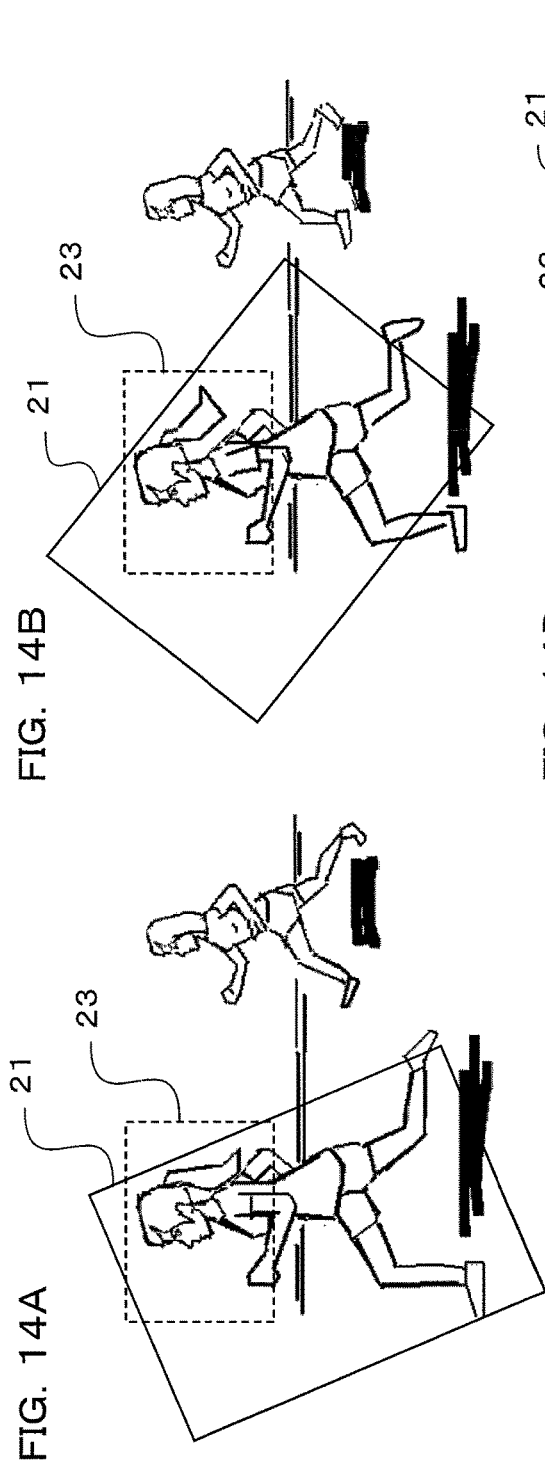
Figure 14C:
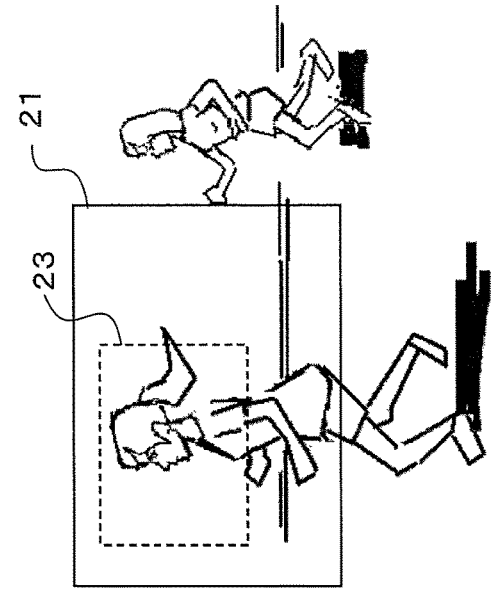
Figure 14D:
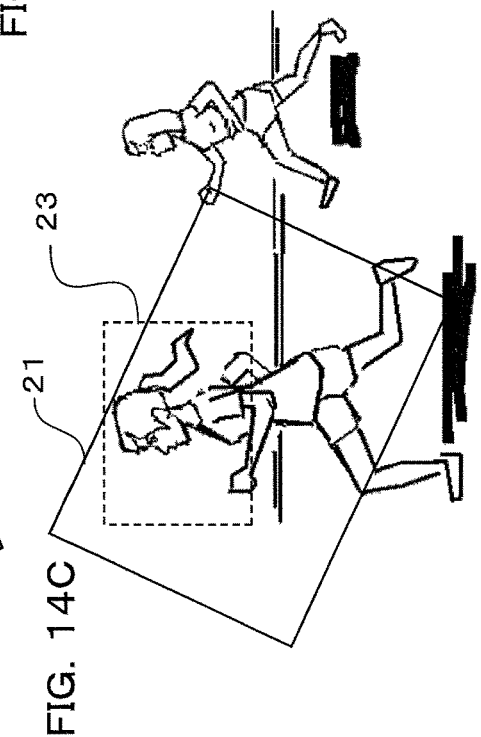

The above power-on operation will be described using FIGS. 14 to 16. FIGS. 14A to 14D show how a photographer looks at a person running in an athletic meeting or the like and tilts the camera 10 to either the left or right side to turn on power and is continuously shooting. FIG. 14A shows when the photographer starts to restore the camera 10 from the state where the camera 10 is tilted to the most tilted angle, FIGS. 14B, 14C show how the camera 10 successively returns to the original position, and FIG. 14D shows when the camera 10 has just returned to the position in the horizontal composition.

As described above, rapid shooting is started in Step S108, and the rapid shooting is performed at a camera field angle 21 at this time as shown in FIGS. 14A to 14D. In a method of turning on the power of a camera by performing a specific operation, such as tilting, in starting an operation, such as tilting, it is likely that the camera has already been directed to an object. Then, in the timing t12 of FIG. 10, i.e., at a turning position of the operation, such as tilting, shooting is started and both the shooting result and the tilt information are recorded.

In order to start recording as soon as possible, in Step S107, shooting is started when the start of a decrease in the gravity in the X direction is detected. At this time, in order for an object image to be displayed, power supply may be started also to the display section 8. Moreover, preferably, the focal length of the photographic lens 2b is initially set to the wide end and the focus position is initially set to approximately 2 to 3 m so as to immediately shoot and so that a main object is in the screen.

Moreover, in order to avoid a wasteful energy loss, strobe light emission and the like are not performed. In Step S116, however, if it is determined that there is the gravity in the Z direction, since the photographer tilts the camera 10 forward and is attempting to view a captured image on the display section 8, as shown in FIG. 16, in this case, the mode is switched to the reproduction mode (see S118).

After completing shooting by an operation of the release button or the like, the camera 10 captures the images of the same face portions and trims these portions to create a series of continuous images. That is, among the images with the camera field angle 21, portions (trimming 23 portions) containing the same face are extracted. At the time of extraction, the tilt of the image is corrected using the tilt correction information that was recorded together with image data at the time of shooting.

Figure 15A:
FIGS. 15A to 15D are views showing the created continuous images in the camera according to the third embodiment of the present invention.
Figure 15B:
Figure 15C:
Figure 15D:
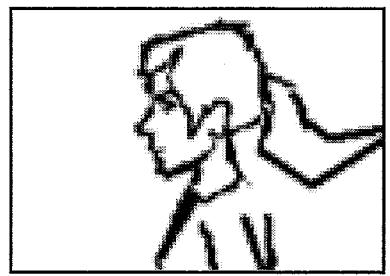
Figure 16:
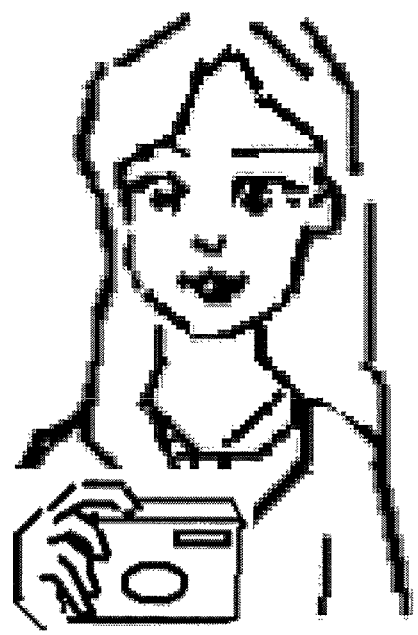
FIG. 16 is a view showing a state where a photographer reproduces and appreciates the created continuous image in the camera according to the third embodiment of the present invention.

FIGS. 15A to 15D area series of continuous images created in this manner. FIG. 15A corresponds to the trimming 23 of FIG. 14A, wherein a portion without the image is colored in black. Likewise, FIG. 15B corresponds to the trimming 23 of FIG. 14B, FIG. 15C corresponds to the trimming 23 of FIG. 14C, and FIG. 15D corresponds to the trimming 23 of FIG. 14D. These series of continuous images may be reproduced as a moving image or may be reproduced as still images.

In this manner, also in the third embodiment of the present invention, as with the first and second embodiments, an output equal to or greater than the gravity force is continuously determined by the acceleration detection section, and if an output equal to or greater than the gravity force is detected (S102b→Yes), then upon detection of a vertical attitude change when the photographer sets the camera while viewing the display section 8 (S107→Yes), power is turned on (power increase 2). Moreover, these operations may reflect the intention of the photographer because these are performed within a predetermined time (S121→Yes). For this reason, power is turned on only by the operation (to tilt the camera to either the left or right side) when the photographer sets the camera. Note that, also in this embodiment, as with the first and second embodiments, whether or not the operation is performed within a predetermined time is determined, but the present invention is not limited thereto, and a determination to regard a motion faster than a predetermined time as unnatural may be added.

Moreover, since in the third embodiment not only power is turned on but shooting is also started just by setting and tilting the camera 10, the photographer will not fail to shoot an object. Moreover, in this embodiment, since shooting is executed in restoring the camera from its tilt state, the image is tilted and is thus difficult to view as is. Such an inconvenience can however be eliminated, since the tilt correction information is recorded at the time of shooting and the tilt is corrected using this tilt correction information. That is, in Step S108, if the image processing and control section 1 serving as the imaging start section starts imaging for causing the image data from the imaging section 2 to be recorded in the recording section 4, which then records the tilt correction information together with the image data. Then, at the time of reproduction of the image data, the tilt of the reproduced image is corrected using the tilt correction information and the resultant reproduced image is displayed on the display section 8 and thus the image is reproduced as an easily viewable one. In addition, since the face portion is extracted by trimming, the image is reproduced as the one satisfying the intention of the photographer.

Next, a fourth embodiment of the present invention will be described using FIG. 17 and FIG. 18. In the first and second embodiments, if the photographer 15 performs an operation, which may not normally occur, from a position where the photographer 15 sets the camera 10, then power is turned on. In the fourth embodiment, if the photographer 15 performs an operation, which may not normally occur, from a position where the photographer 15 sets the camera 10 and furthermore selects an operation mode on the display screen, then power is turned on. The configuration in the fourth embodiment is the same as that of FIG. 1 of the first embodiment, and the flow shown in FIG. 7 just needs to be replaced with a flowchart shown in FIG. 18. The description is provided focusing on the different points.

FIGS. 17A to 17D show how to turn on the power of the camera 10 in the fourth embodiment. FIG. 17A shows the state when the photographer 15 shakes the camera 10 right and left while the photographer 15 has set the camera 10 to shoot. In the second embodiment, the photographer 15 shakes the camera 10 right and left just once, while in the fourth embodiment, the photographer 15 may shake the camera 10 right and left once or more than once. As shown in FIG. 17B, returning to the position where the photographer 15 set the camera 10, three operation modes, i.e., a moving image shooting mode, a reproduction mode, and a still image shooting mode, are displayed on the display section 8 of the camera 10 as shown in FIGS. 17C, 17D.

When three operation modes are displayed, the photographer 15 touches either one of the operation modes with his/her finger and this fact is detected by the touch panel 8b. FIG. 17C shows the state when the photographer 15 has touched the "still image shooting" mode with the right finger while FIG. 17D shows the state when the photographer 15 has touched the "moving image shooting" mode. Since the photographer 15 often holds the camera 10 firmly with both hands in shooting a moving image while in shooting a still image the photographer often holds the camera 10 with a single hand, the positions of the "moving image shooting" mode and "still image shooting" mode are disposed as shown in FIGS. 17C, 17D.

Figure 18:
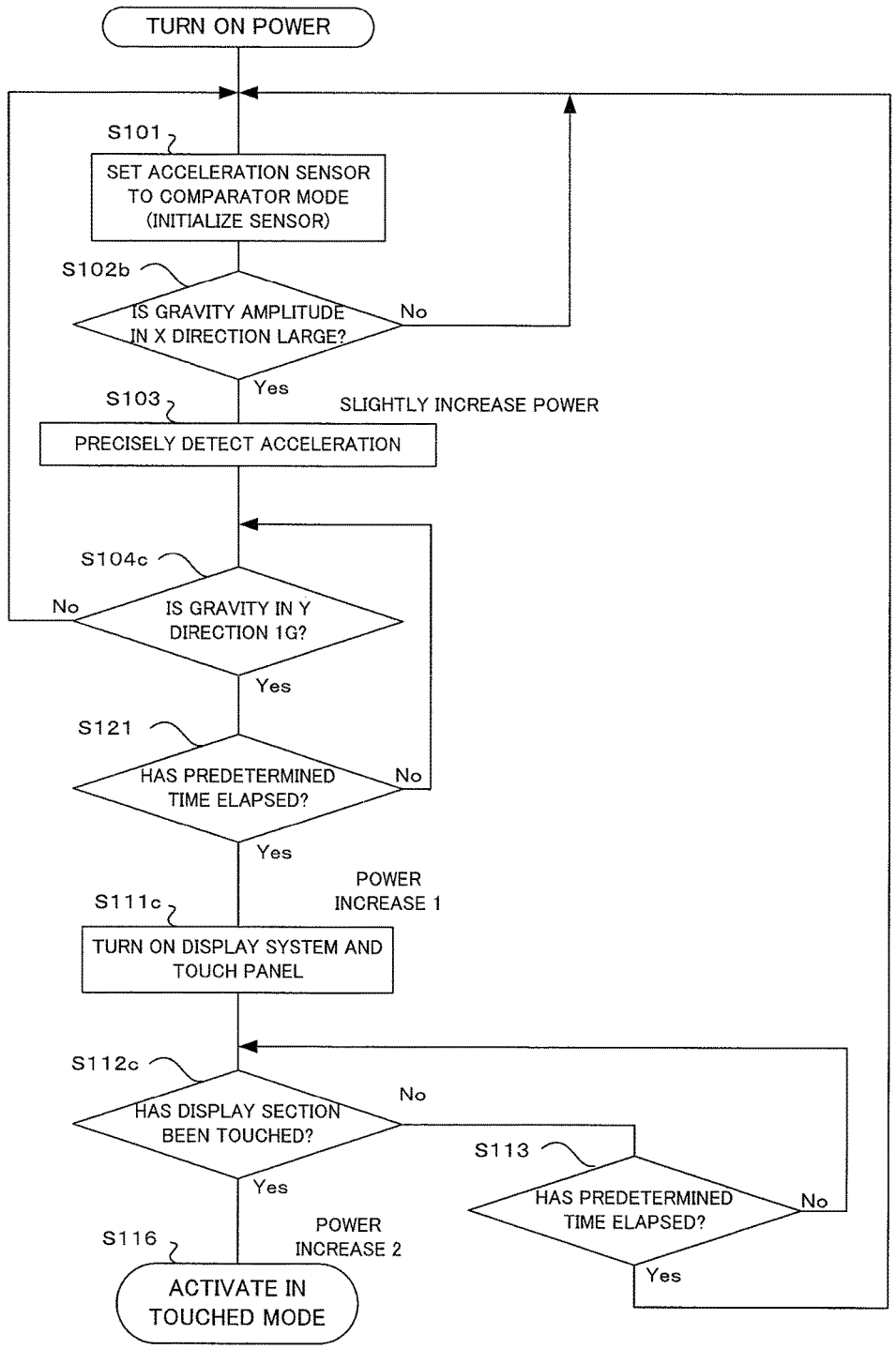
FIG. 18 is a flowchart showing an operation to turn on power of a camera according to the fourth embodiment of the present invention.

Next, the power-on operation in the fourth embodiment of the present invention is described using a flowchart shown in FIG. 18. Since this power-on flowchart is the same as that in the first embodiment shown in FIG. 7 except that Step S102 is replaced with S102b, Step S104 with S104c, Step S111 with S111c, and Step S112 with S112c, and the Step S104 to Step S111 are modified as shown in the view. Hence, the description is provided focusing on these different points.

Entering the power-on flow, if the acceleration sensor is set to the comparator mode (S101), then whether or not the gravity amplitude in the X direction is large is determined (S102b) as with the second embodiment. Here, whether or not the output of the acceleration sensor 50X exceeds a value equal to approximately 3 G is determined. Since the acceleration in the X direction increases as the camera 10 is shaken, the determination here is whether or not the photographer 15 shook the camera in order to turn on power.

If the gravity amplitude in the X direction is large as a result of the determination in Step S102b, then the acceleration is precisely detected (S103) and whether or not the gravity of approximately 1 G is applied in the Y direction is determined (S104c). In this Step, the signal output of the acceleration sensor 50Y is A/D-converted, and whether or not the resultant value becomes approximately 1 G is determined. While the camera 10 is shaken, the signal output of the acceleration sensor 50Y varies largely and will not be stabilized at approximately 1 G. If the gravity in the Y direction is not approximately 1 G as a result of the determination in this Step S104c, then the flow returns to Step S101 to enter the power-off state.

If the gravity in the Y direction becomes approximately 1 G as a result of the determination in Step S104c, then whether or not a predetermined time has elapsed is determined (S121). Here, it is determined whether or not the predetermined time has elapsed since clocking is started at a time point when the gravity in the Y direction became 1 G in Step S104c. Note that the predetermined time is a time of such an order that the state where the photographer sets the camera after shaking the camera can be regarded as stable.

If the predetermined time has not elapsed as a result of the determination in Step S121, the flow returns to Step S104c. On the other hand, if the predetermined time has elapsed, the power increase 1 is performed and the display system and the touch panel are turned on (S111c). Here, because the camera 10 may become stable in the state where the photographer sets the camera 10, three operation modes, such as the "moving image shooting" mode, as described above are displayed on the display section 8 and the detection of a touch state is started by means of the touch panel 8b.

Subsequently, whether or not the display section 8 has been touched is determined (S112c). Here, it is determined by the touch panel 8b whether or not the display section 8 has been touched. If the display section 8 has not been touched yet as a result of this determination, then whether or not a predetermined time has elapsed is determined (S113). Here, it is determined whether or not the predetermined time has elapsed since clocking is started at a time point when the power increase 1 was performed in Step S111c. If the predetermined time has not elapsed as a result of this determination, the flow returns to Step S112c. If the predetermined time has elapsed as a result of this determination, the flow returns to Step S101 to turn off power.

If the display section 8 has been touched as a result of the determination in Step S112c, the power increase 2 is performed and the camera 10 is activated in a touched mode (S116). This results in the power-on state. By performing the power increase 2, the camera 10 enters the power-on state and the normal camera operation can be performed.

In this manner, also in the fourth embodiment of the present invention, as with the first and second embodiments, an output equal to or greater than the gravity force is continuously determined by the acceleration detection section, and when the detection signal is output from the comparator 5a, the output signal of the acceleration detection section 5 is A/D-converted and the behavior of the output signal is precisely detected. Then, if it is detected that the camera 10 enters a stable state, then the operation modes are displayed, and power is turned on if the photographer 15 selects either one of the operation modes. In this embodiment, the verification of the operation to tilt forward and backward or the operation to tilt right and left is not performed elaborately unlike in the first and second embodiments. The power is however unlikely to be turned on due to a malfunction, since selection of an operation mode is made by the photographer before turning on power. Note that, also in this embodiment, as with the first to third embodiments, whether or not the operation is performed within a predetermined time is determined (S121→Yes), but the present invention is not limited thereto, and a determination to regard a motion faster than the predetermined time as unnatural may be added.

As described above, in each of the embodiments of the present invention, the power of the camera is turned on when an output equal to or greater than the gravity force is detected and also a specific motion of the camera is detected. Hence, power is turned on only by the operation when the photographer sets the camera, and in the other states the power will not be turned on due to a malfunction.

That is, in just determination of whether or not there is vibration equal to or greater than the gravity force, extremely low power consumption is required, which state may be a substantially power-off state. In contrast to this, in the conventional sleep mode, the power consumption is higher than that in the present invention and the power supply is exhausted and as a result, depending on circumstances photographers often miss a shutter chance. In such an extremely low-power consumption state, power can be immediately turned on just by performing a specific motion while the photographer sets the camera. Moreover, in turning on power, the motion of the camera is determined and only if a specific motion that is not normally performed is performed, power is turned on.

Note that, in the respective embodiments of the present invention, as the specific motions, the following four cases have been described: the case where the camera is tilted forward and subsequently restored to the original position (first embodiment), the case where the camera is tilted to either the left or right side (third embodiment), the case where the camera is tilted to either the left or right side and subsequently restored to the original position (second embodiment), and the case where the camera is shaken (fourth embodiment). The present invention is however not limited thereto, and any motion, other than the above-described motions, that is unlikely to occur in normal daily operations may be employed.

Moreover, in each of the embodiments of the present invention, as the sensor for detecting the motion of the camera, an acceleration sensor has been described as an example. The present invention is however not limited thereto, and any sensor, such as an angular acceleration sensor or a gyroscope, capable of detecting the motion of the camera may be applicable.

Furthermore, in each of the embodiments of the present invention, before turning on power, power is supplied to several circuits, such as the acceleration detection section 5, the gravity determination section 1*d*, the touch panel 8*b*. The circuits, to which power is supplied until the power is turned on from the power-off state, are not limited to the above-described circuits, but may be suitably selected according to the determination conditions of whether or not to turn on power.

Furthermore, in each of the embodiments of the present invention, as the apparatus for shooting, a digital camera has been used and described, however, as the camera, a digital single lens reflex camera or a compact digital camera may be used, or a camera, such as a video camera or a movie camera, for moving images may be applicable, or a camera incorporated in a mobile phone, a Personal Digital Assistant (PDA), a game machine, or the like may be applicable.

The present invention is not limited to the above-described embodiments as such, and the constituent elements may be modified and embodied in the implementation stage without departing from the scope of the present invention. Moreover, various inventions can be made from a suitable combination of a plurality of constituent elements disclosed in the above-described embodiments. For example, several constituent elements among all the constituent elements shown in the embodiments may be deleted. Furthermore, the constituent elements across the different embodiments may be suitably combined.

What is claimed is:

1. An imaging device, comprising:
   a) an imaging sensor photoelectrically converting an object image and outputting image data;
   b) a display;
   c) a recording medium recording the image data;
   d) a movement detection section that detects an attitude change of the imaging device; and
   e) a controller causing the object image to be displayed on the display based on the recorded image data,
      wherein, responsive to the movement detection section detecting the attitude change of the imaging device, the controller starts continuous shooting, regardless of whether or not a shutter release button of the imaging device is pressed, for recording a series of still images corresponding to the image data in the recording medium before displaying the object image on the display.

2. The imaging device according to claim 1, wherein the controller continues the continuous shooting when causing the display to start displaying.

3. The imaging device according to claim 1, wherein the controller turns off imaging by the imaging sensor when causing the display not to start displaying.

4. The imaging device according to claim 1, further comprising:
   f) a tilt detection sensor detecting tilt information about a tilt state of the imaging device,
      wherein the controller records the tilt information together with each of the still images when recording the series of still images corresponding to the image data.

5. The imaging device according to claim 4, wherein a tilt of an image in the image data is corrected using the tilt information before it is displayed on the display.

6. The imaging device according to claim 1, further comprising:
   f) a tilt detection sensor detecting tilt information about a tilt state of the imaging device,
      wherein the controller determines whether or not to display the object image on the display based on the tilt information.

7. The imaging device according to claim 1, wherein the controller deletes the image data obtained by the continuous shooting when being switched to a reproduction mode.

8. The imaging device according to claim 1, further comprising:
   f) a photographic lens for forming the object image,
      wherein a focal length of the photographic lens is set wide when power of the imaging device is turned on.

9. The imaging device according to claim 1, further comprising:
   f) a photographic lens for forming the object image,
      wherein a focus position of the photographic lens is set to a predetermined initial value when power of the imaging device is turned on.

10. The imaging device according to claim 9 wherein the predetermined initial value is between 2 and 3 meters.

11. The imaging device according to claim 1 further comprising:
    f) the shutter release button,
       wherein the continuous shooting is completed responsive to a user operation of the shutter release button.

12. The imaging device according to claim 1 wherein the controller deletes older images in the series of still images corresponding to the image data recorded in the recording medium when a predetermined memory capacity is reached.

13. The imaging device according to claim 1 wherein the controller starts continuous shooting responsive to a user interaction with respect to the imaging device.

14. The imaging device according to claim 1 wherein the controller starts continuous shooting responsive to a user interaction with respect to the imaging device reflecting an intention of the user to begin image capture, the user interaction including tilting the imaging device from a first orientation and then returning the imaging device towards the first orientation.

15. A control method for an imaging device, comprising:
   a) detecting whether an attitude change of the imaging device has occurred; and
   b) responsive to detecting that the attitude change of the imaging device has occurred,
      (1) repeatedly photoelectrically converting, regardless of whether or not a shutter release button of the imaging device is pressed, an object image to output image data corresponding to a series of still images,
      (2) recording the image data in a recording medium, and
      (3) after repeatedly photoelectrically converting and recording, displaying the object image on a display based on the recorded image data.

16. The control method for an imaging device according to claim 15, wherein the continuous shooting is continued when the display is caused to start displaying.

17. The control method for an imaging device according to claim 15, wherein imaging is turned off when the display is caused not to start displaying.

18. The control method for an imaging device according to claim 15, further comprising:
   c) detecting tilt information about a tilt state of the imaging device, and
   d) recording the tilt information together with the image data when recording the continuous shooting.

19. The control method for an imaging device according to claim 18, further comprising:
   e) correcting a tilt of an image in the image data using the tilt information.

20. The control method for an imaging device according to claim 15, comprising:
   c) detecting tilt information about a tilt state of the imaging device; and
   d) determining whether or not to display the object image on the display section based on the tilt information.

21. The control method for an imaging device according to claim 15, wherein a control section deletes the image data obtained by the continuous shooting when being switched to a reproduction mode.

22. The control method for an imaging device according to claim 15, further comprising:
   c) setting a focal length of a photographic lens of the imaging device wide when power of the imaging device is turned on.

23. The control method for an imaging device according to claim 15, further comprising:
   c) setting a focus position of a photographic lens of the imaging device to a predetermined initial value when power of the imaging device is turned on.

24. The control method for an imaging device according to claim 23 wherein the predetermined initial value is between 2 and 3 meters.

25. The control method for an imaging device according to claim 15 further comprising:
   c) completing the continuous shooting responsive to a user operation of a shutter release button of the imaging device.

26. The control method for an imaging device according to claim 15 further comprising:
   c) deleting older images in the series of still images corresponding to the image data recorded in the recording medium when a predetermined memory capacity is reached.

* * * * *